United States Patent

Ishikawa

(10) Patent No.: US 11,960,003 B2
(45) Date of Patent: Apr. 16, 2024

(54) CONTROL DEVICE FOR OBJECT DETECTION DEVICE, OBJECT DETECTION DEVICE, AND NON-TRANSITORY COMPUTER-READABLE STORAGE MEDIUM

(71) Applicant: Mitsubishi Electric Corporation, Tokyo (JP)

(72) Inventor: Kentaro Ishikawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 478 days.

(21) Appl. No.: 17/122,440

(22) Filed: Dec. 15, 2020

(65) Prior Publication Data

US 2021/0096247 A1    Apr. 1, 2021

Related U.S. Application Data

(63) Continuation of application No. PCT/JP2018/028186, filed on Jul. 27, 2018.

(51) Int. Cl.
*G01S 15/93* (2020.01)
*G01P 3/00* (2006.01)
(Continued)

(52) U.S. Cl.
CPC .............. *G01S 15/931* (2013.01); *G01P 3/00* (2013.01); *G01S 7/52004* (2013.01); *G08G 1/16* (2013.01)

(58) Field of Classification Search
CPC .. G01S 7/52004; G01S 15/325; G01S 15/931; G01S 2007/52009; G08G 1/166;
(Continued)

(56) References Cited

U.S. PATENT DOCUMENTS 4,542,489 A * 9/1985 Naruse .................. G08B 29/04
367/93
6,127,964 A    10/2000 Kageyama
(Continued)

FOREIGN PATENT DOCUMENTS

JP    11-264871 A    9/1999
JP    2002-131428 A    5/2002
(Continued)

OTHER PUBLICATIONS

Chinese Office Action and Search Report for Chinese Application No. 201880095742.3, dated Jan. 10, 2024, with English translation.

*Primary Examiner* — Daniel L Murphy
*Assistant Examiner* — Amie M Ndure
(74) *Attorney, Agent, or Firm* — BIRCH, STEWART, KOLASCH & BIRCH, LLP

(57) ABSTRACT

A control device includes: an object detector to output a signal for causing a transmitter to transmit an object detection ultrasonic wave, obtain an output signal from a receiver, and detect an object; an abnormality detector to perform, as an abnormality detection process, outputting a signal for causing the transmitter to transmit an abnormality detection ultrasonic wave whose transmission time is longer than that of the object detection ultrasonic wave, obtaining, from the receiver, an output signal in a period in which the abnormality detection ultrasonic wave is to be received as a direct wave, and detecting an abnormality in the transmitter or receiver when no signal of the direct wave is included; and a determiner to obtain a speed of a vehicle including the transmitter and receiver, and when the speed is not greater than a threshold, cause the abnormality detector to start the abnormality detection process.

8 Claims, 13 Drawing Sheets

(51) Int. Cl.
*G01S 7/52* (2006.01)
*G01S 15/931* (2020.01)
*G08G 1/16* (2006.01)

(58) Field of Classification Search
CPC .. G08G 1/165; G08G 1/16; G01P 3/00; F02B 75/22; F02B 61/045; F02B 2075/1824; F02B 2075/025; F02D 41/22; F02D 41/1487; F02D 2400/04; F02D 2041/227; F02D 41/008
See application file for complete search history.

(56) References Cited

U.S. PATENT DOCUMENTS

| | | | |
|---|---|---|---|
| 2002/0047780 A1 | 4/2002 | Nishimoto et al. | |
| 2005/0046584 A1* | 3/2005 | Breed | G06F 3/0237 340/13.31 |
| 2011/0241858 A1* | 10/2011 | Tsuzuki | G01S 7/54 340/435 |
| 2014/0355385 A1* | 12/2014 | Inagaki | G01S 15/878 367/99 |
| 2017/0219698 A1* | 8/2017 | Matsuura | G01S 7/52006 |
| 2020/0011969 A1* | 1/2020 | Noro | G01S 7/521 |
| 2020/0391816 A1* | 12/2020 | Kuroba | G01S 7/521 |

FOREIGN PATENT DOCUMENTS

| | | | |
|---|---|---|---|
| JP | 4020084 B2 | | 12/2007 |
| JP | 2010-210412 A | | 9/2010 |
| JP | 2010210412 A | * | 9/2010 |
| JP | 2011-215002 A | | 10/2011 |
| JP | 2013-535680 A | | 9/2013 |
| JP | 2014-232070 A | | 12/2014 |
| JP | 5798150 B2 | | 10/2015 |

\* cited by examiner

OBJECT DETECTION ULTRASONIC
WAVE WAVEFORM

ABNORMALITY DETECTION
ULTRASONIC WAVE WAVEFORM

RECEIVED WAVE WAVEFORM
(NORMAL STATE)

RECEIVED WAVE WAVEFORM
(ABNORMAL STATE)

RECEIVED WAVE WAVEFORM
(NO ERRONEOUS DETECTION)

OBJECT DETECTION ULTRASONIC WAVE WAVEFORM

ABNORMALITY DETECTION ULTRASONIC WAVE WAVEFORM

RECEIVED WAVE WAVEFORM (NORMAL STATE)

RECEIVED WAVE WAVEFORM (ABNORMAL STATE)

RECEIVED WAVE WAVEFORM (ERRONEOUS DETECTION)

FIG. 12

| | PATTERN | 1 | 2 | 3 | 4 | 5 | 6 | 7 | 8 |
|---|---|---|---|---|---|---|---|---|---|
| STATES OF ULTRASONIC TRANSCEIVERS | ULTRASONIC TRANSCEIVER A | NORMAL | NORMAL | NORMAL | NORMAL | FAILURE | FAILURE | FAILURE | FAILURE |
| | ULTRASONIC TRANSCEIVER B | NORMAL | NORMAL | FAILURE | FAILURE | NORMAL | NORMAL | FAILURE | FAILURE |
| | ULTRASONIC TRANSCEIVER C | NORMAL | FAILURE | NORMAL | FAILURE | NORMAL | FAILURE | NORMAL | FAILURE |
| DETERMINATION RESULTS | A TO B | a | a | c | c | b | b | c | c |
| | A TO C | a | c | a | c | b | c | b | c |
| | B TO A | a | a | b | b | c | c | c | c |

FIG. 14

| | PATTERN | 1 | 2 | 3 | 4 | 5 | 6 | 7 | 8 |
|---|---|---|---|---|---|---|---|---|---|
| STATES OF ULTRASONIC TRANSCEIVERS | ULTRASONIC TRANSCEIVER A | NORMAL | NORMAL | NORMAL | NORMAL | NORMAL | ABNORMAL | ABNORMAL | ABNORMAL |
| | ULTRASONIC TRANSCEIVER B | NORMAL | NORMAL | ABNORMAL | ABNORMAL | ABNORMAL | NORMAL | NORMAL | ABNORMAL |
| | ULTRASONIC TRANSCEIVER C | NORMAL | ABNORMAL | NORMAL | ABNORMAL | NORMAL | ABNORMAL | NORMAL | ABNORMAL |
| DETERMINATION RESULTS | A TO B | a | a | c | c | c | c | c | c |
| | A TO C | a | c | a | c | c | c | c | c |
| | NOISE LEVELS OF A TO B AND C | a | c | c | a | a | c | c | a |
| | B TO C | a | c | c | c | c | c | c | c |
| | NOISE LEVELS OF B TO A AND C | a | c | a | c | c | a | c | a | ns
CONTROL DEVICE FOR OBJECT DETECTION DEVICE, OBJECT DETECTION DEVICE, AND NON-TRANSITORY COMPUTER-READABLE STORAGE MEDIUM

CROSS REFERENCE TO RELATED APPLICATION

This application is a continuation of International Application No. PCT/JP2018/028186, filed on Jul. 27, 2018, the disclosure of which is incorporated herein by reference in its entirety.

BACKGROUND OF THE INVENTION

1. Field of the Invention

The present invention relates to an object detection device that detects an abnormality in an ultrasonic transmitter or an ultrasonic receiver for performing object detection, a control device therefor, and a non-transitory computer-readable storage medium.

2. Description of the Related Art

There is conventionally known an object detection device that detects an object around a vehicle by using ultrasonic waves. The object detection device transmits an ultrasonic wave by using an ultrasonic transmitter and receives a reflected wave reflected and returned from a nearby object by using an ultrasonic receiver. When a reflected wave is successfully received, the object detection device detects that there is an object nearby.

The functions of transmitting and receiving ultrasonic waves of the ultrasonic transmitter and ultrasonic receiver provided in the object detection device deteriorate depending on the condition of use or the duration of use. For example, since the ultrasonic transmitter and ultrasonic receiver are provided on an outer surface of the vehicle, they are likely to be subjected to damage due to contact with outside objects or adhesion of contaminants, such as dirt or water droplets. This can interfere with normal transmission and reception of ultrasonic waves. Also, the aged deterioration of the ultrasonic transmitter and ultrasonic receiver prevents normal transmission and reception of ultrasonic waves.

As a measure against these problems, Patent Literature 1 discloses a technique of detecting a deterioration (referred to below as an abnormality) in the function of transmitting and receiving ultrasonic waves. An object detection device of Patent Literature 1 determines whether a direct wave that reaches an ultrasonic receiver directly from an ultrasonic transmitter is received by the ultrasonic receiver, and when it is not received, detects an abnormality in the ultrasonic transmitter or ultrasonic receiver.

Patent Literature 1: Japanese Patent Application Publication No. 2014-232070

However, in the abnormality detection, when the object detection device of Patent Literature 1 receives a noise in a period in which the direct wave is to be received, even though it does not actually receive the direct wave, it may erroneously determine the noise as the direct wave. In this case, there is a problem in that although there is an abnormality in the ultrasonic transmitter or ultrasonic receiver, the abnormality cannot be detected.

SUMMARY OF THE INVENTION

The present invention has been made to solve the problem as described above, and provides an object detection device, a control device therefor, and a non-transitory computer-readable storage medium that make it possible to accurately detect an abnormality in an ultrasonic transmitter or an ultrasonic receiver even when a noise is received in a period in which a direct wave is to be received.

A control device for an object detection device according to the present invention includes: an object detector to output, to an ultrasonic transmitter, an input signal for causing the ultrasonic transmitter to transmit an object detection ultrasonic wave that is an ultrasonic wave transmitted for object detection, to obtain, from an ultrasonic receiver, an output signal in a period in which the object detection ultrasonic wave is reflected by an object around the ultrasonic transmitter and received as a reflected wave by the ultrasonic receiver, to determine whether the output signal includes a signal of the reflected wave, and to detect the object; an abnormality detector to perform, as an abnormality detection process, outputting, to the ultrasonic transmitter, an input signal for causing the ultrasonic transmitter to transmit an abnormality detection ultrasonic wave that is an ultrasonic wave whose transmission time is longer than that of the object detection ultrasonic wave, obtaining, from the ultrasonic receiver, an abnormality detection output signal that is an output signal in a period in which the abnormality detection ultrasonic wave is to be received as a direct wave by the ultrasonic receiver, determining whether the abnormality detection output signal includes a signal of the direct wave, and detecting an abnormality in the ultrasonic transmitter or the ultrasonic receiver when no signal of the direct wave is included; and a determiner to obtain speed information indicating a speed of a vehicle during driving provided with the ultrasonic transmitter and the ultrasonic receiver, determine whether the speed indicated by the speed information is not greater than a second threshold that is a predetermined positive threshold, and when a vehicle stop condition that the speed indicated by the speed information is not greater than the second threshold is satisfied, cause the abnormality detector to start the abnormality detection process.

An object detection device according to the present invention includes: an ultrasonic transceiver including an ultrasonic transmitter provided in a vehicle and two ultrasonic receivers provided in the vehicle and capable of receiving an ultrasonic wave from the ultrasonic transmitter; an object detector connected to the ultrasonic transceiver, the object detector outputting, to the ultrasonic transmitter, an input signal for causing the ultrasonic transmitter to transmit an object detection ultrasonic wave that is an ultrasonic wave for performing object detection, obtaining, from at least one of the two ultrasonic receivers, an output signal in a period in which the object detection ultrasonic wave is reflected by an object around the ultrasonic transceiver and received as a reflected wave by the ultrasonic receiver, determining whether the output signal includes a signal of the reflected wave, and detecting the object; and an abnormality detector connected to the ultrasonic transceiver, the abnormality detector performing, as an abnormality detection process, outputting, to the ultrasonic transmitter, an input signal for causing the ultrasonic transmitter to transmit an abnormality detection ultrasonic wave that is an ultrasonic wave whose transmission time is longer than that of the object detection ultrasonic wave, obtaining, from each of the two ultrasonic receivers, an abnormality detection output signal that is an output signal in a period in which the abnormality detection ultrasonic wave is to be received as a direct wave by the ultrasonic receiver, determining whether each of the abnormality detection output signals includes a signal of the direct wave, obtaining, from each of the two ultrasonic receivers, an output signal in a period different from the period in which the direct wave is to be received by the ultrasonic receiver, calculating, for each of these output signals, a noise level indicating an intensity of noise, and when each of the abnormality detection output signals obtained from the two ultrasonic receivers includes no signal of the direct wave and a difference between the two calculated noise levels is not less than a predetermined fifth threshold, detecting that there is an abnormality in the ultrasonic transmitter.

A non-transitory computer-readable storage medium according to the present invention stores an object detection program for causing a control device connected to an ultrasonic transmitter and an ultrasonic receiver to function as: an object detector to output, to the ultrasonic transmitter, an input signal for causing the ultrasonic transmitter to transmit an object detection ultrasonic wave that is an ultrasonic wave transmitted for object detection, to obtain, from the ultrasonic receiver, an output signal in a period in which the object detection ultrasonic wave is reflected by an object around the ultrasonic transmitter and received as a reflected wave by the ultrasonic receiver, to determine whether the output signal includes a signal of the reflected wave, and to detect the object; an abnormality detector to perform, as an abnormality detection process, outputting, to the ultrasonic transmitter, an input signal for causing the ultrasonic transmitter to transmit an abnormality detection ultrasonic wave that is an ultrasonic wave whose transmission time is longer than that of the object detection ultrasonic wave, obtaining, from the ultrasonic receiver, an abnormality detection output signal that is an output signal in a period in which the abnormality detection ultrasonic wave is to be received as a direct wave by the ultrasonic receiver, determining whether the abnormality detection output signal includes a signal of the direct wave, and detecting an abnormality in the ultrasonic transmitter or the ultrasonic receiver when no signal of the direct wave is included; and a determiner to obtain speed information indicating a speed of a vehicle during driving provided with the ultrasonic transmitter and the ultrasonic receiver, determine whether the speed indicated by the speed information is not greater than a second threshold that is a predetermined positive threshold, and when a vehicle stop condition that the speed indicated by the speed information is not greater than the second threshold is satisfied, cause the abnormality detector to start the abnormality detection process.

In the present invention, an ultrasonic wave whose transmission time is longer than that of an object detection ultrasonic wave is used as an abnormality detection ultrasonic wave in abnormality detection.

Thus, even when a noise is received in a period in which a direct wave is to be received, it is possible to accurately detect an abnormality in an ultrasonic transmitter or an ultrasonic receiver.

BRIEF DESCRIPTION OF DRAWINGS

FIG. 12 is a table showing a relationship between results of the abnormality detection process and abnormal parts, in the object detection device according to the fourth embodiment of the present invention.

FIG. 14 is a table showing a relationship between results of the abnormality detection process and abnormal parts, in the object detection device according to the fifth embodiment of the present invention.

DETAILED DESCRIPTION OF THE INVENTION

Figure 1:
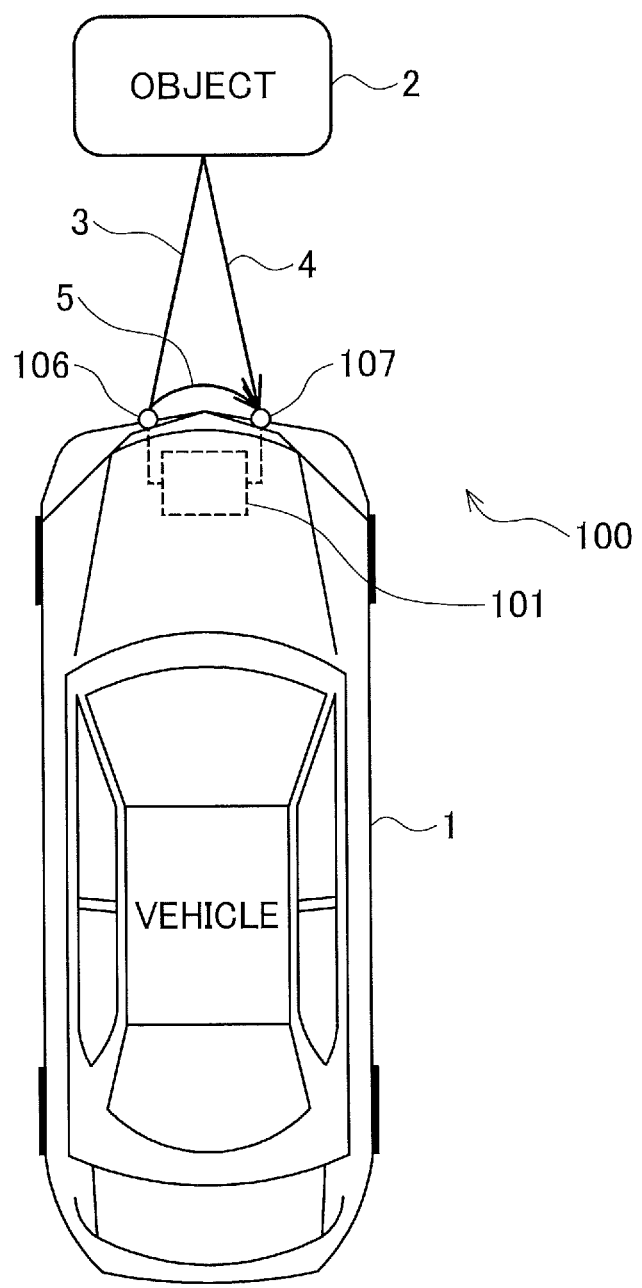
FIG. 1 is a diagram illustrating a situation in which an ultrasonic transmission/reception unit of an object detection device according to a first embodiment of the present invention transmits and receives ultrasonic waves.

Embodiments of the present invention will be described below with reference to the drawings. The same reference characters in the drawings denote the same or corresponding parts.

First Embodiment

A first embodiment of the present invention will be described below with reference to FIGS. 1 to 8. First, object detection and abnormality detection of an ultrasonic transmission/reception unit (or ultrasonic transceiver) will be outlined by using an example (FIG. 1) of a vehicle 1 provided with an object detection device 100 according to the first embodiment of the present invention. Then, the configuration of the object detection device 100, the operation of the object detection device 100, and advantages of the first embodiment will be described in this order.

FIG. 1 illustrates an example of the vehicle 1 provided with the object detection device 100. The object detection device 100 includes an ultrasonic transmission/reception unit including an ultrasonic transmitter 106 and an ultrasonic receiver 107, and a control device (or controller) 101 that controls the ultrasonic transmission/reception unit. FIG. 1 illustrates a situation in which the ultrasonic transmitter 106 and ultrasonic receiver 107 transmit and receive ultrasonic waves.

The ultrasonic transmission/reception unit is provided on an outer surface of the vehicle 1. The control device 101 is provided inside the vehicle 1, and is formed by an electronic control unit (ECU) that is communicably connected to the ultrasonic transmission/reception unit.

The control device 101 causes the ultrasonic transmitter 106 to transmit an ultrasonic wave, determines whether the ultrasonic wave transmitted from the ultrasonic transmitter 106 is included in ultrasonic waves received by the ultrasonic receiver 107, and performs detection of an object 2 around the vehicle 1 and detection of an abnormality in the ultrasonic transmission/reception unit.

First, the object detection around the vehicle 1 will be outlined.

The object detection around the vehicle 1 is performed to avoid collision during driving of the vehicle 1 by a user or during autonomous driving of the vehicle 1. The object detection device 100 calculates the presence or absence of an object 2 around the vehicle 1 and a distance to the object 2, in order to avoid collision of the vehicle 1.

Specifically, the control device 101 causes the ultrasonic transmitter 106 to transmit a transmission wave 3 that is an ultrasonic wave transmitted by the ultrasonic transmitter 106 to the periphery of the vehicle 1. As illustrated in FIG. 1, when there is an object 2 around the vehicle 1, the transmission wave 3 transmitted from the ultrasonic transmitter 106 is reflected by the object 2 and returned to the vehicle 1 as a reflected wave 4. The reflected wave 4 is received by the ultrasonic receiver 107 and detected by the control device 101.

When the control device 101 determines that the ultrasonic receiver 107 receives the reflected wave 4, it detects that there is an object 2 around the vehicle 1. It also calculates a distance to the object 2 by using an elapsed time that is a time difference from the transmission of the transmission wave 3 to the reception of the reflected wave 4 and a sound speed.

The object detection device 100 performs the object detection around the vehicle 1 in this manner, and upon detection of an object 2, transmits information indicating the presence or absence of an object 2 and the distance to the object 2, to an autonomous driving control device, a collision avoidance device, or the like.

As the sound speed, a sound speed at an average temperature of an environment in which the vehicle 1 is used is used as a fixed value.

Next, the abnormality detection of the ultrasonic transmission/reception unit will be outlined.

Since the ultrasonic transmission/reception unit is located on the outer surface of the vehicle 1, contaminants, such as dirt, snow, ice, or water droplets, that interfere with transmission and reception of ultrasonic waves adhere to the ultrasonic transmission/reception unit. The adhesion of contaminants reduces the ultrasonic transmission intensity or ultrasonic reception sensitivity, and deteriorates the function of transmission and reception of the ultrasonic transmission/reception unit. Also, the function of the ultrasonic transmission/reception unit deteriorates due to aging or external impact.

A deterioration of the function of transmission and reception of the ultrasonic transmission/reception unit as described above is referred to as an abnormality, and the state in which it has deteriorated is referred to as the abnormal state. Also, a fact that the transmission intensity or reception sensitivity has become zero is referred to as a failure, and the state in which the transmission intensity or reception sensitivity is zero is referred to as the failure state. The abnormal state includes the failure state.

The abnormality detection of the ultrasonic transmission/reception unit is performed to check as appropriate whether the ultrasonic transmission/reception unit for object detection is in the abnormal state.

To detect an abnormality in the ultrasonic transmission/reception unit, the object detection device 100 determines whether a transmission wave 3 transmitted by the ultrasonic transmitter 106 is received by the ultrasonic receiver 107.

Specifically, the control device 101 first causes the ultrasonic transmitter 106 to transmit a transmission wave 3. As illustrated in FIG. 1, the transmission wave 3 directly reaches the ultrasonic receiver 107, is received as a direct wave 5, and is detected by the control device 101.

When the control device 101 determines that the ultrasonic receiver 107 fails to receive the direct wave 5, it detects an abnormality in the ultrasonic transmitter 106 or ultrasonic receiver 107.

The object detection device 100 performs the abnormality detection of the ultrasonic transmission/reception unit in this manner, and upon detection of an abnormality, transmits information indicating the abnormality to other control devices, such as an ECU that controls warning light indication of the vehicle 1, the autonomous driving control device, or the collision avoidance device.

An ultrasonic wave transmitted from the ultrasonic transmitter 106 in performing the object detection is referred to as an object detection ultrasonic wave, and an ultrasonic wave transmitted from the ultrasonic transmitter 106 in performing the abnormality detection is referred to as an abnormality detection ultrasonic wave.

Next, the above-described abnormality detection will be specifically described with reference to FIGS. 2A to 2E and 3A to 3E.

FIGS. 2A to 2E and 3A to 3E illustrate examples of the waveforms of transmission waves 3 transmitted from the ultrasonic transmitter 106 and the waveforms of received waves that are ultrasonic waves received by the ultrasonic receiver 107. FIGS. 2A to 2E illustrate an example in which the object detection device 100 of the first embodiment is used, and FIGS. 3A to 3E illustrate a comparative example. Specifically, FIGS. 2A to 2E illustrate waveforms in the case of using, as the abnormality detection ultrasonic wave, an ultrasonic wave whose transmission time is longer than that of the object detection ultrasonic wave. On the other hand, FIGS. 3A to 3E illustrate waveforms in the case of using, as the abnormality detection ultrasonic wave, an ultrasonic wave whose transmission time is equal to that of the object detection ultrasonic wave.

In the first embodiment, since the abnormality detection ultrasonic wave whose transmission time is longer than that of the object detection ultrasonic wave is used, it is easy to discriminate between the waveform (FIG. 2C) of the received wave when the ultrasonic transmission/reception unit functions normally and receives the direct wave 5 and the waveform (FIG. 2E) of the received wave when the ultrasonic transmission/reception unit cannot receive the direct wave 5 and receives an ultrasonic wave (represented by the dotted line) from another vehicle, which is an example of a noise.

On the other hand, in the comparative example, since the abnormality detection ultrasonic wave whose transmission time is equal to that of the object detection ultrasonic wave is used, it is difficult to discriminate between the waveform (FIG. 3C) of the received wave when the ultrasonic transmission/reception unit functions normally and receives the direct wave 5 and the waveform (FIG. 3E) of the received wave when the ultrasonic transmission/reception unit cannot receive the direct wave 5 and receives an ultrasonic wave (the dotted line) from another vehicle.

As can be seen from a comparison between them, in the first embodiment, by using the abnormality detection ultrasonic wave whose transmission time is longer than that of the object detection ultrasonic wave, it is possible to discriminate a noise, such as an ultrasonic wave from another vehicle, and improve the accuracy of the abnormality detection.

Here, the lengths of the transmission times of ultrasonic waves will be described.

The ultrasonic transmitter 106 transmits an ultrasonic wave each time an object detection process is performed, and each time an abnormality detection process is performed. The object detection process described here is a process for detecting the reflected wave 4 once, and the abnormality detection process described here is a process for detecting the direct wave 5 once.

One ultrasonic wave refers to an ultrasonic wave transmitted each time the object detection process is performed and each time the abnormality detection process is performed. Also, when the length of the transmission time of an ultrasonic wave is referred to, it refers to the length of the transmission time of one ultrasonic wave as described above.

Also, the length of the transmission time of one ultrasonic wave refers to the length of time from the time when the ultrasonic transmitter 106 starts vibration to transmit the ultrasonic wave to the time when the ultrasonic transmitter 106 ends the vibration (from the start to the end of the waveform of the transmitted ultrasonic wave) in one object detection process or abnormality detection process. Although the ultrasonic wave may be interrupted as a result of modulation in one object detection process or abnormality detection process, the time of the interruption is not considered as the end. The length of the transmission time is defined as the length of time from the time when the ultrasonic transmitter 106 starts vibration to transmit the ultrasonic wave to the last time the ultrasonic transmitter 106 ends the vibration, in the ultrasonic wave transmitted in one object detection process or abnormality detection process.

Figure 2A:
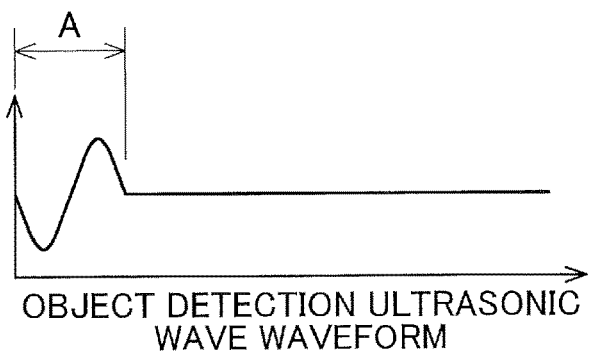
FIGS. 2A to 2E are diagrams illustrating a specific example of the waveforms of transmission waves and the waveforms of received waves in the first embodiment of the present invention.
Figure 2B:
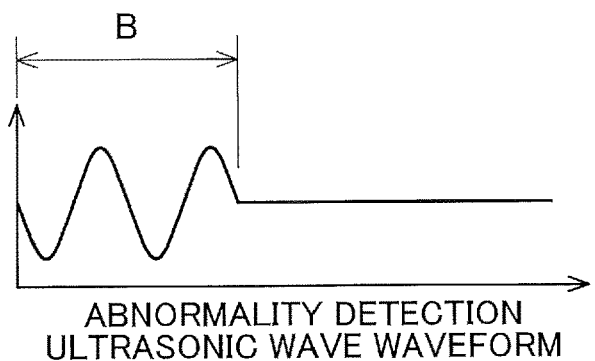
Figure 3A:
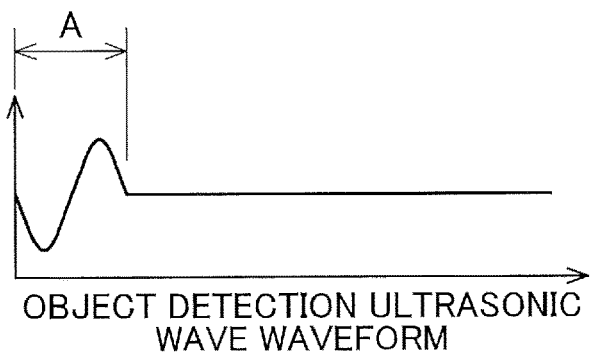
FIGS. 3A to 3E are diagrams illustrating an example (comparative example) of the waveforms of transmission waves and the waveforms of received waves in a case of using the same ultrasonic wave as an object detection ultrasonic wave and an abnormality detection ultrasonic wave.
Figure 3B:
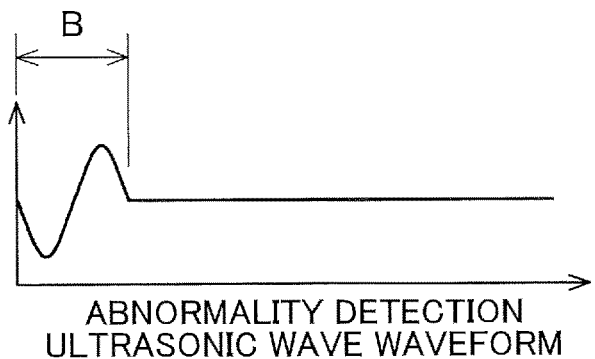

FIGS. 2A and 2B and FIGS. 3A and 3B describe times A indicating the transmission times of the ultrasonic waves used in the object detections and times B indicating the transmission times of the ultrasonic waves used in the abnormality detections. As illustrated in FIGS. 2A and 2B, in the first embodiment, the transmission time B of the abnormality detection ultrasonic wave is longer than the transmission time A of the object detection ultrasonic wave. Also, as illustrated in FIGS. 3A and 3B, in the comparative example, the transmission time B of the abnormality detection ultrasonic wave is equal to the transmission time A of the object detection ultrasonic wave.

FIGS. 2A to 2E and 3A to 3E will be described in detail. In each graph, the vertical axis corresponds to the amplitude of an ultrasonic wave, and the horizontal axis corresponds to time.

First, the lengths of the transmission times of the object detection ultrasonic wave and abnormality detection ultrasonic wave will be described. The graphs of FIGS. 2A and 3A each illustrate the waveform of the object detection ultrasonic wave. The graphs of FIGS. 2B and 3B each illustrate the waveform of the abnormality detection ultrasonic wave. As illustrated in the graphs of FIGS. 2A and 3A, the object detection ultrasonic waves are the same, whereas as illustrated in the graphs of FIGS. 2B and 3B, the abnormality detection ultrasonic wave in the first embodiment in FIG. 2 is longer.

Specifically, as illustrated in the graphs of FIGS. 2A and 2B, the object detection device 100 according to the first embodiment uses, as the abnormality detection ultrasonic wave, an ultrasonic wave whose transmission time is longer than that of the object detection ultrasonic wave (the transmission time B is longer than the transmission time A). In FIGS. 2A and 2B, the object detection ultrasonic wave is one cycle of an ultrasonic wave, and the abnormality detection ultrasonic wave is two cycles of an ultrasonic wave. They have the same frequency.

On the other hand, in FIGS. 3A to 3E presented as a comparative example, as illustrated in the graphs of FIGS. 3A and 3B, the same ultrasonic wave is used as the object detection ultrasonic wave and abnormality detection ultrasonic wave (the transmission time B is equal to the transmission time A).

Next, the length of the waveform of the received direct wave 5 will be described. The graphs of FIGS. 2C and 3C each illustrate the waveform of the received wave when the ultrasonic transmission/reception unit is in the normal state and the direct wave 5 corresponding to the abnormality detection ultrasonic wave is successfully received. As illustrated in these graphs, in the first embodiment in FIG. 2C, the received wave received by the ultrasonic receiver 107 is long, and in the comparative example in FIG. 3C, the received wave is short.

Figure 2C:
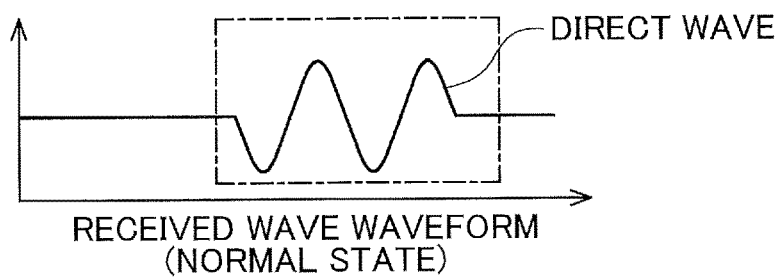
Figure 2D:
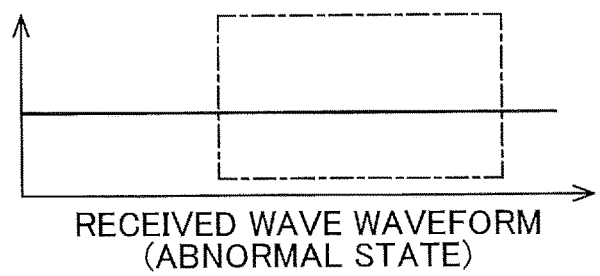
Figure 3C:
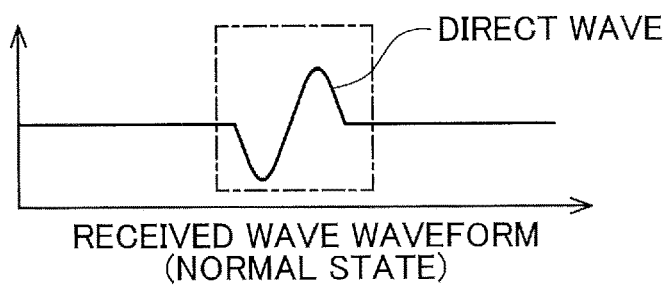
Figure 3D:
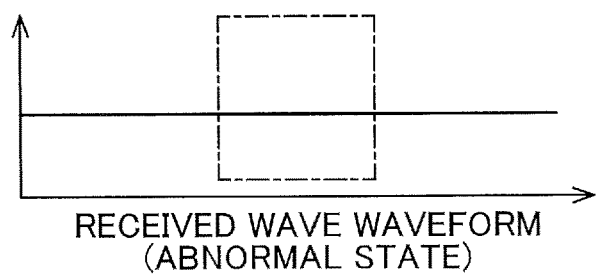

Also, the graphs of FIGS. 2D and 3D each illustrate the waveform when the ultrasonic transmission/reception unit is in the abnormal state and the direct wave 5 corresponding to the abnormality detection ultrasonic wave is not successfully received. In each case, the signal does not include the waveform of the direct wave 5 and is a constant signal.

Here, the period defined by the dashed-dotted line is a period in which the direct wave 5 is to be received, and the object detection device 100 determines whether an ultrasonic wave having a waveform corresponding to the waveform of the abnormality detection ultrasonic wave is received by the ultrasonic receiver 107 in this period, and detects the direct wave 5. The distance between the ultrasonic transmitter 106 and the ultrasonic receiver 107 is determined in designing the vehicle 1, and the period in which the direct wave 5 is to be received can be determined by using the distance and a sound speed.

In the graphs of FIGS. 2C and 3C, the waveform of the direct wave 5 corresponding to the waveform of the abnormality detection ultrasonic wave is present in the period defined by the dashed-dotted line, and it can be determined that the ultrasonic transmitter 106 transmits ultrasonic waves normally and the ultrasonic receiver 107 receives ultrasonic waves normally.

In the graphs of FIGS. 2D and 3D, the waveform of the direct wave 5 corresponding to the waveform of the abnormality detection ultrasonic wave is not present in the period defined by the dashed-dotted line, and it can be determined that the ultrasonic transmitter 106 does not transmit ultrasonic waves normally or the ultrasonic receiver 107 does not receive ultrasonic waves normally.

Finally, a case where an ultrasonic wave having a short transmission time from another vehicle, which is an example of a noise, is received will be described. The graphs of FIGS. 2E and 3E each illustrate the waveform of the received wave when the ultrasonic transmission/reception unit is abnormal and receives an ultrasonic wave transmitted by another vehicle. In each graph, the waveform of the ultrasonic wave, whose transmission time is short, transmitted by the other vehicle is present.

Here, the ultrasonic wave transmitted by the other vehicle is an ultrasonic wave that is about one to a few cycles (one cycle in FIGS. 2E and 3E) of a wave and has a short transmission time, as with the object detection ultrasonic wave. The reason is as follows.

When an ultrasonic wave is transmitted from the ultrasonic transmitter 106, the direct wave 5 traveling along the shortest path from the ultrasonic transmitter 106 to the ultrasonic receiver 107 is first received by the ultrasonic receiver 107. After that, the reflected wave 4 reflected from an object 2 around the vehicle 1 is received by the ultrasonic receiver 107. In the object detection, from the presence or absence of the reflected wave 4 and an elapsed time until reception of the reflected wave 4, the presence or absence of an object 2 is detected, and the distance is calculated. Thus, while the detection of the reflected wave 4 is important, the detection of the reflected wave 4 is not easy in a part of the waveform of the received wave in which the reflected wave 4 and direct wave 5 overlap each other. Thus, it is made possible to detect the reflected wave 4 even when an object 2 exists very close to the vehicle 1, by shortening the waveform of the received direct wave 5 as much as possible to shorten the period in which the direct wave 5 and reflected wave 4 overlap each other by shortening the transmission time of the object detection ultrasonic wave.

For example, when the vehicle 1 is being parked, it is required to detect an object 2, such as a vehicle or a wall, very close thereto, and alert the user. To make it possible to detect an object very close thereto, the object detection ultrasonic wave needs to be an ultrasonic wave whose transmission time is short.

For the above reason, the vehicle 1 and the other vehicle that are provided with the object detection device 100 according to the first embodiment need to use an ultrasonic wave whose transmission time is short, for the object detection.

Figure 3E:
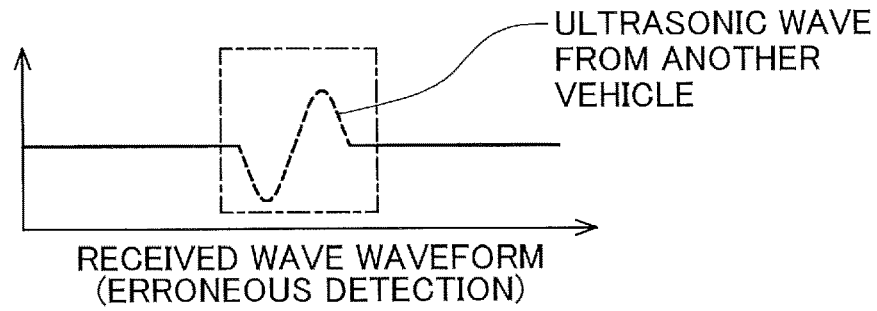

In the comparative example in FIGS. 3A to 3E, as the abnormality detection ultrasonic wave, an ultrasonic wave whose transmission time is short and that is the same as the object detection ultrasonic wave is used (the transmission time B is equal to the transmission time A). For the above reason, the ultrasonic wave from the other vehicle also has a short transmission time. Thus, when the ultrasonic wave from the other vehicle is received in the period in which the direct wave 5 is to be received, as illustrated in the graph of FIG. 3E, it is difficult to determine whether the direct wave 5 is received or the ultrasonic wave from the other vehicle is received (see FIGS. 3C and 3E). Thus, in a state in which the ultrasonic transmission/reception unit has an abnormality and cannot receive the direct wave 5, when the ultrasonic wave from the other vehicle is received, it is erroneously detected as the direct wave 5, and the abnormality detection is erroneously performed.

Figure 2E:
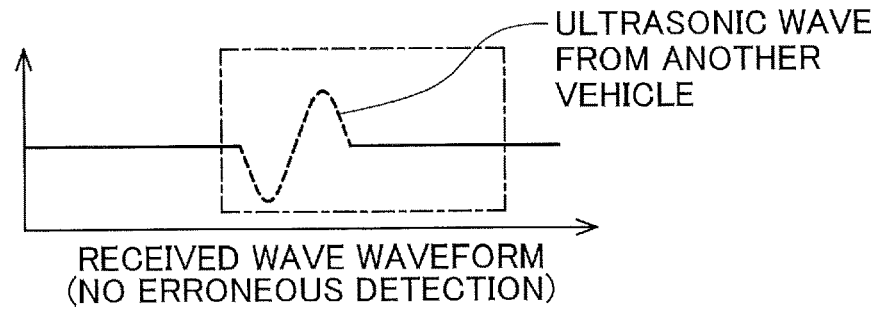

On the other hand, in the first embodiment, the transmission time of the abnormality detection ultrasonic wave is longer than that of the object detection ultrasonic wave (the transmission time B is longer than the transmission time A). Thus, even when the ultrasonic wave having the short transmission time from the other vehicle is received in the period in which the direct wave 5 is to be received, as illustrated in the graph of FIG. 2E, since the ultrasonic wave from the other vehicle is shorter than the direct wave 5, the discrimination is easy (see FIGS. 2C and 2E). Thus, in a state in which the ultrasonic transmission/reception unit has an abnormality and cannot receive the direct wave 5, when the ultrasonic wave from the other vehicle is received, it is not erroneously detected as the direct wave 5.

As above, the object detection device 100 of the first embodiment uses, as the abnormality detection ultrasonic wave, an ultrasonic wave whose transmission time is longer than that of the object detection ultrasonic wave. This can improve the accuracy of the abnormality detection.

Here, for convenience, description has been made using an example in which the ultrasonic transmission/reception unit is in the failure state. However, even when the ultrasonic transmission/reception unit is in the abnormal state but is not in the failure state (when the direct wave 5 is received slightly), it is possible to prevent the ultrasonic wave from the other vehicle from being erroneously detected as the direct wave 5 and improve the accuracy of the abnormality detection.

Specifically, when the ultrasonic receiver 107 receives the direct wave 5 slightly (when a weak waveform of the direct wave 5 is present in the graphs of FIGS. 2D and 3D), since the direct wave 5 is below a proper intensity, it can be determined that the ultrasonic transmitter 106 does not transmit ultrasonic waves normally or the ultrasonic receiver 107 does not receive ultrasonic waves normally. At this time, when the ultrasonic wave from the other vehicle is received, as described above, in the comparative example, it is difficult to determine whether the direct wave 5 is received or the ultrasonic wave from the other vehicle is received. On the other hand, in the first embodiment, even when the ultrasonic wave from the other vehicle having a short transmission time is received in the period in which the direct wave 5 is to be received, since the ultrasonic wave from the other vehicle is shorter than the direct wave 5, the discrimination is easy.

The object detection and the abnormality detection of the ultrasonic transmission/reception unit by the object detection device 100 according to the first embodiment of the present invention have been outlined above.

Next, the configuration of the object detection device 100 according to the first embodiment of the present invention will be described with reference to the hardware configuration diagram of FIG. 4.

The object detection device 100 includes the control device 101, a transmission amplifier 105, the ultrasonic transmitter 106, the ultrasonic receiver 107, a reception amplifier 108, a vehicle speed sensor 109, a vehicle speed ECU 110, a bus 111, and signal lines 112. It also includes an in-vehicle camera 113, a camera control ECU 114, a global positioning system (GPS) positioning sensor 115, a positioning ECU 116, a communication ECU 117, and a radio wave transceiver 118.

The control device 101 is connected via the bus 111 to the vehicle speed ECU 110, camera control ECU 114, positioning ECU 116, and communication ECU 117. The control device 101 is connected to via signal lines 112 to the transmission amplifier 105 and reception amplifier 108.

Also, the transmission amplifier 105 is connected via a signal line 112 to the ultrasonic transmitter 106, the reception amplifier 108 is connected via a signal line 112 to the ultrasonic receiver 107, and the vehicle speed ECU 110 is connected via a signal line 112 to the vehicle speed sensor 109. Further, the camera control ECU 114 is connected via a signal line 112 to the in-vehicle camera 113, the positioning ECU 116 is connected via a signal line 112 to the GPS positioning sensor 115, and the communication ECU 117 is connected via a signal line 112 to the radio wave transceiver 118.

The in-vehicle camera 113, camera control ECU 114, GPS positioning sensor 115, positioning ECU 116, communication ECU 117, and radio wave transceiver 118 are not essential for the first embodiment. The in-vehicle camera 113 and camera control ECU 114 will be described in detail in a second embodiment. The GPS positioning sensor 115, positioning ECU 116, communication ECU 117, and radio wave transceiver 118 will be described in detail in a third embodiment.

First, the control device 101 of the object detection device 100 will be described.

The control device 101 is an ECU, and includes a central processing unit (CPU) 102, a memory 103, and an interface 104. The control device 101 generates input signals for causing the ultrasonic transmitter 106 to transmit ultrasonic waves, receives output signals generated by the ultrasonic receiver 107, and performs the object detection process and abnormality detection process.

The CPU 102 reads a program stored in the memory 103 and executes the program. The CPU 102 performs the abnormality detection process and object detection process.

The memory 103 stores the program executed by the CPU 102. The memory 103 is constituted by a random access memory (RAM) that stores temporary data when the CPU 102 executes the program, and a read only memory (ROM) that stores the program executed by the CPU 102 and thresholds.

Also, the RAM temporarily stores an output signal of the ultrasonic receiver 107 and speed information indicating the speed of the vehicle 1 that are transmitted by the reception amplifier 108 and vehicle speed ECU 110.

The interface 104 transmits and receives signals in performing the abnormality detection process and object detection process. The interface 104 transmits signals generated by the CPU 102 to the transmission amplifier 105. It also receives signals transmitted by the reception amplifier 108, vehicle speed ECU 110, camera control ECU 114, positioning ECU 116, and communication ECU 117, which are connected to the control device 101.

Also, the interface 104 includes an analog/digital converter and a digital/analog converter, converts digital signals generated and transmitted to the transmission amplifier by the CPU 102 into analog signals, and converts analog signals transmitted from the reception amplifier 108 to digital signals.

Next, the other components of the object detection device 100 will be described.

First, the transmission amplifier 105 and ultrasonic transmitter 106, which are components for transmitting ultrasonic waves corresponding to input signals generated by the control device 101, will be described.

The transmission amplifier 105 is connected via the signal line 112 to the control device 101, and connected via the signal line 112 to the ultrasonic transmitter 106 so that it can transmit signals. The transmission amplifier 105 amplifies input signals transmitted from the control device 101 and transmits them to the ultrasonic transmitter 106.

The ultrasonic transmitter 106 is connected via the signal line 112 to the transmission amplifier 105, and includes a vibrator that vibrates according to the waveform of an input signal transmitted from the transmission amplifier 105. The ultrasonic transmitter 106 vibrates a medium, such as surrounding air, by the vibrator vibrating and transmits an ultrasonic wave.

Next, the ultrasonic receiver 107 and reception amplifier 108, which generate and transmit an output signal received by the control device 101 to perform the object detection process or abnormality detection process, will be described.

The ultrasonic receiver 107 includes a vibrator that vibrates according to vibrations corresponding to the frequencies (e.g., not less than 18 kHz or 20 kHz) of ultrasonic waves out of the vibrations of a medium, such as surrounding air. Also, the ultrasonic receiver 107 is connected via the signal line 112 to the reception amplifier 108 so that it can transmit a signal, generates an output signal corresponding to vibration of the vibrator, and transmits it to the reception amplifier 108.

The reception amplifier 108 is connected via the signal line 112 to the control device 101, is also connected via the signal line 112 to the ultrasonic receiver 107, and amplifies the output signal transmitted from the ultrasonic receiver 107 and transmits it to the control device 101.

Next, the vehicle speed sensor 109 and vehicle speed ECU 110, which measure and transmit the speed of the vehicle 1 used by the control device 101 to determine whether to start the object detection process or to start the abnormality detection process, will be described.

The vehicle speed sensor 109 generates pulse signals in proportion to a rotational frequency of a drive wheel of the vehicle 1. The vehicle speed sensor 109 is connected via the signal line 112 to the vehicle speed ECU 110, and transmits the pulse signals to the vehicle speed ECU 110.

The vehicle speed ECU 110 calculates the speed of the vehicle 1 according to the number of pulse signals transmitted from the vehicle speed sensor 109 and transmits speed information indicating the speed of the vehicle 1 to the control device 101 via the bus 111. The transmission of the speed information is performed at regular intervals.

Next, the bus 111 and signal lines 112, which connect the components of the object detection device 100, will be described.

The bus 111 is a communication line that connects the control device 101 and each ECU, and transmits signals transmitted and received between the ECUs.

The bus 111 forms an in-vehicle network, through which CAN frames specified by the control area network (CAN) protocol are transmitted and received.

The signal lines 112 are communication lines that connect between devices, such as the ultrasonic transmitter 106, not belonging to the in-vehicle network formed by the bus 111, and transmit signals transmitted and received between the devices.

Here, the configuration of the control device 101 will be described with reference to FIG. 5.

A determiner 121 has a function of determining whether to start the object detection process or to start the abnormality detection process, on the basis of the speed information indicating the speed of the vehicle 1 received from the vehicle speed ECU 110 via the interface 104.

An object detector 122 has a function of generating an input signal for causing the ultrasonic transmitter 106 to transmit an object detection ultrasonic wave, on the basis of a determination by the determiner 121 that the object detection process is to be started.

The object detector 122 also has a function of obtaining a part of an output signal transmitted from the reception amplifier 108 via a receiver 125 (to be described later) in a period in which the object detection ultrasonic wave is reflected by an object 2 around the vehicle 1 and received as the reflected wave 4 by the ultrasonic receiver 107, determining whether the part of the output signal includes a signal of the reflected wave 4, and detecting the object 2.

An abnormality detector 123 has a function of generating an input signal for causing the ultrasonic transmitter 106 to transmit an abnormality detection ultrasonic wave, on the basis of a determination by the determiner 121 that the abnormality detection process is to be started.

The abnormality detector 123 also has a function of obtaining a part (referred to below as an abnormality detection output signal) of an output signal transmitted from the reception amplifier 108 via the receiver 125 (to be described later) in a period in which the abnormality detection ultrasonic wave is to be received as the direct wave 5 by the ultrasonic receiver 107, determining whether the abnormality detection output signal includes a signal of the direct wave 5, and detecting an abnormality in the ultrasonic transmission/reception unit.

A transmitter 124 has a function of converting digital signals that are input signals generated by the object detector 122 and abnormality detector 123, into analog signals, and transmitting them to the transmission amplifier 105 via the signal line 112.

The receiver 125 has a function of receiving an analog signal that is an output signal generated by the ultrasonic receiver 107 by receiving ultrasonic waves, from the reception amplifier 108 via the signal line 112, converting it into a digital signal, and outputting it to the object detector 122 and abnormality detector 123.

The determiner 121, object detector 122, and abnormality detector 123 are implemented by the CPU 102 executing a program for providing the functions of the respective units. The transmitter 124 and receiver 125 are implemented by the interface 104.

The configuration of the object detection device 100 has been described above.

Next, the operation of the object detection device 100 will be described. First, the operation of the object detection device 100 in the abnormality detection process and object detection process will be described, and then the operation in a process of determining whether to start the abnormality detection will be described.

Figure 6:
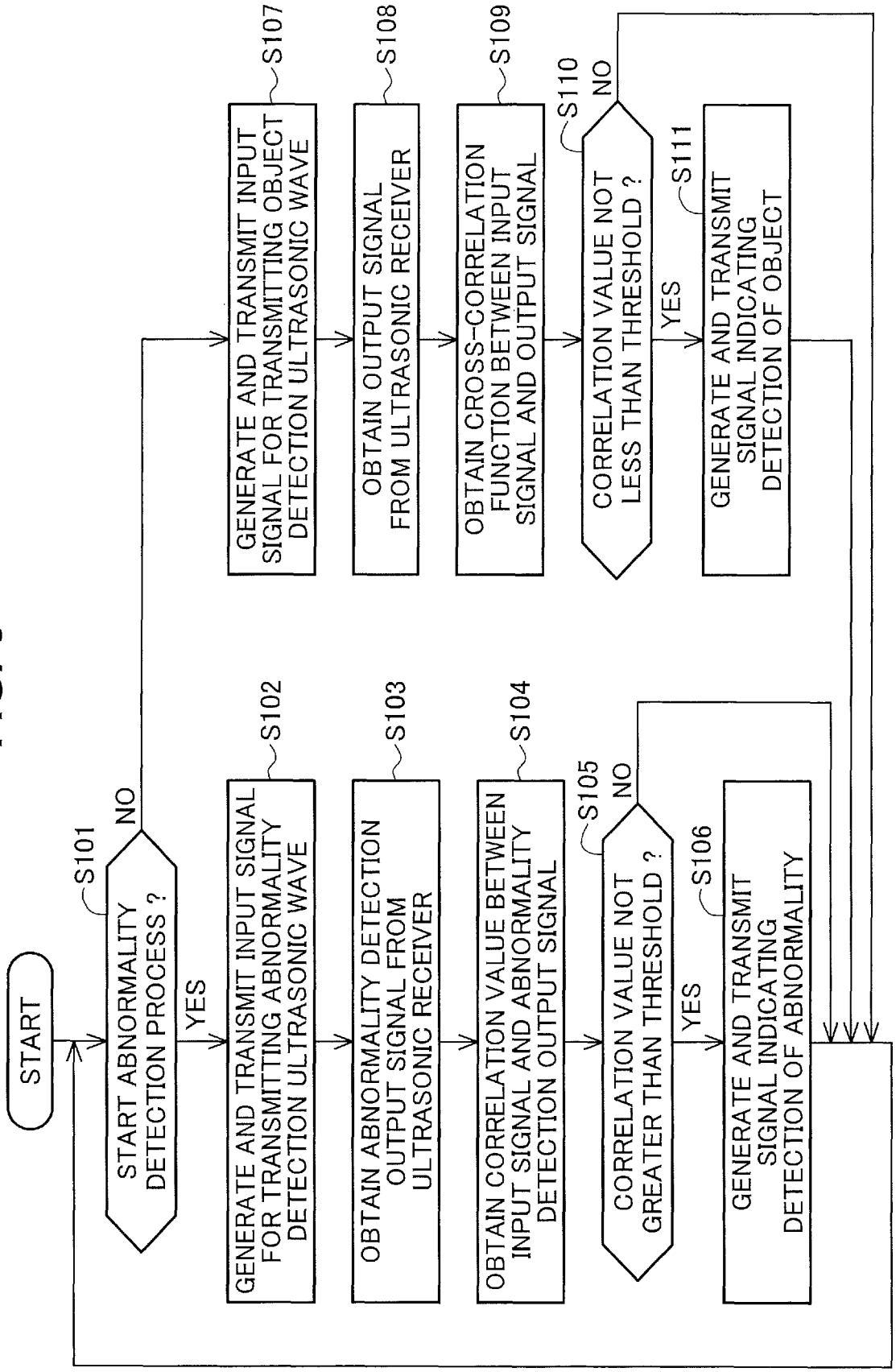
FIG. 6 is a flowchart of an abnormality detection process and an object detection process of the object detection device according to the first embodiment of the present invention.

The operation of the object detection device 100 in the abnormality detection process and object detection process follows the flowchart of FIG. 6.

The abnormality detection process of the object detection device 100 is performed by the abnormality detector 123 of the control device 101, and the object detection process is performed by the object detector 122 of the control device 101.

The abnormality detection process and object detection process are started when the vehicle 1 is turned on.

Specifically, when the vehicle 1 is turned on, the CPU 102 of the control device 101 reads, from the memory 103, the program for performing the abnormality detection process and object detection process, and starts a process based on the program.

The CPU 102 performs a process of determining whether to start the abnormality detection, and determines whether to start the abnormality detection or to start the object detection (step S101).

The process of determining whether to start the abnormality detection will be described in detail later.

First, the flow of the abnormality detection process (steps S102 to S106) will be described.

When the CPU 102 determines to start the abnormality detection (YES in step S101), it generates an input signal for causing the ultrasonic transmitter 106 to transmit an abnormality detection ultrasonic wave, and transmits it to the transmission amplifier 105 via the interface 104 (transmitter 124) (step S102).

Specifically, the CPU 102 reads the transmission time and signal waveform of the abnormality detection ultrasonic wave that are previously stored in the memory 103, and generates a digital signal that is an input signal having a length corresponding to the transmission time.

The interface 104 converts the generated digital signal into an analog signal by means of the digital/analog converter included therein, and transmits it to the transmission amplifier 105.

Also, the CPU 102 stores the waveform of the input signal in the memory 103.

Here, the transmission time of the abnormality detection ultrasonic wave stored in the memory 103 is set to be longer than the transmission time of the object detection ultrasonic wave.

Then, the CPU 102 obtains an output signal (the abnormality detection output signal) of the ultrasonic receiver 107 in the period in which the abnormality detection ultrasonic wave is to be received as the direct wave 5 by the ultrasonic receiver 107 (step S103).

Specifically, the ultrasonic receiver 107 continuously generates an output signal and transmits it to the reception amplifier 108. Then, the output signal is amplified by the reception amplifier 108 and transmitted to the interface 104. The interface 104 converts the output signal, which is an analog signal, into a digital signal by means of the analog/digital converter included therein. The CPU 102 stores in the memory 103 the output signal after the conversion into the digital signal. The CPU 102 reads a part (the abnormality detection output signal) of the sequentially stored output signal after the elapse of a predetermined time from the time of transmission of the input signal.

Here, the predetermined time is a time obtained by adding an internal processing time to a direct wave propagation time. The direct wave propagation time is a time from when the ultrasonic transmitter 106 starts to transmit the abnormality detection ultrasonic wave to when the ultrasonic receiver 107 starts to receive the direct wave 5. The internal processing time is a time required for internal processing, such as signal generation, transmission and reception, and writing and reading into and from the memory 103, in the object detection device 100.

Also, since the length of the direct wave 5 is equal to the length of the abnormality detection ultrasonic wave, the length (duration) of the read abnormality detection output signal is from the time when the predetermined time elapses to the time when a time equal to the transmission time of the abnormality detection ultrasonic wave elapses.

In other words, when the input signal is denoted by s(t), the output signal is denoted by r(t) (t being time and the time of the start of transmission of the input signal s(t) being zero), and the predetermined time is denoted by $\tau_1$, the output signal r(t) read from the memory 103 is signals starting from r(τ$_1$) after the elapse of the predetermined time τ$_1$, not from r(0) that is the signal at the same time as s(0).

Next, the CPU 102 obtains a correlation value between the generated input signal and the abnormality detection output signal (step S104).

The correlation value R$_{s,r}$(τ$_1$) between the input signal s(t) and the output signal r(t) is obtained by the following equation:

$$R_{s,r}(\tau_1) = \int_0^{T_1} s(t) r(t+\tau_1) dt. \quad (1)$$

Here, τ$_1$ is the time from the start of the waveform of the input signal to the start of the waveform of the abnormality detection output signal, and is equal to the predetermined time used in step S103. In the above equation, by adding τ$_1$ to the time of the output signal r(t), the product of the input signal s(t) at time t and r(t+τ$_1$) at the time when the predetermined time ti has elapsed since time t and the direct wave 5 is received is obtained.

Also, since the integration is performed over the entire interval of the input signal s(t), the integration interval is from time zero to time τ$_1$ when the transmission time of the abnormality detection ultrasonic wave elapses. That is, the integration interval is set to be an interval having a length equal to the length of the transmission time of the abnormality detection ultrasonic wave. This is also equal to the length of the direct wave 5.

According to the above equation, the correlation value between the input signal and the output signal is obtained as follows.

When it is assumed that the start of the input signal is at t=0, the input signal is expressed by a function s(t) (0≤t≤T$_1$) of the amplitude starting from time zero. Also, the output signal is expressed by a function r(t) (τ$_1$≤t≤T$_1$+τ$_1$) of the amplitude after the elapse of τ$_1$ since the start (t=0) of the input signal.

The correlation value at τ$_1$ is obtained by taking the product of the input signal s(t) at time t and the output signal r(t+τ$_1$) at t+τ$_1$, which are the functions, and integrating it.

Step S104 will be specifically described. The CPU 102 first reads the input signal from the memory 103. The CPU 102 obtains the product of the amplitudes at the start points of the input signal and the abnormality detection output signal obtained in step S103, and following the calculation of the start points, obtains the products of the amplitudes up to the end points (which corresponds to obtaining the product of s(t) and r(t+τ$_1$) in the above equation). The CPU 102 then sums the obtained products of the values of the amplitudes to obtain the correlation value.

Then, the CPU 102 reads a first threshold from the memory 103, and determines whether the correlation value is not greater than the first threshold (step S105). The first threshold is a threshold for determining whether the output signal includes a waveform of the direct wave 5. When the first threshold is set to a great value, it is possible to detect minor abnormalities, i.e., abnormalities other than failures, in the ultrasonic transmission/reception unit. Also, when it is set to a small value, it is possible to detect major abnormalities, i.e., failures. To prevent erroneously detecting the ultrasonic wave from the other vehicle, which is an example of a noise, as the direct wave, the first threshold needs to be not less than a certain value. Specifically, a value not less than the correlation value between the input signal of the abnormality detection ultrasonic wave and the output signal at the time of receiving the ultrasonic wave from the other vehicle is used. More specifically, since the length of the transmission time of the ultrasonic wave from the other vehicle is the same as that of the object detection ultrasonic wave of the first embodiment, a value not less than a sixth threshold (to be described later) that is a threshold for determining the presence or absence of the reflected wave 4 in the object detection process of the first embodiment is used.

When the CPU 102 determines that the correlation value is not greater than the first threshold (YES in step S105), it detects an abnormality in the ultrasonic transmission/reception unit. Then, the CPU 102 generates a signal indicating that an abnormality has been detected, and transmits it via the interface 104 to other devices connected to the in-vehicle network (step S106).

After the CPU 102 determines that the correlation value is greater than the first threshold (NO in step S105), and after the CPU 102 generates the signal indicating that an abnormality has been detected and transmits it (step S106), the CPU 102 performs again the process of determining whether to start the abnormality detection, and repeats the flow.

Next, the flow of the object detection process (steps S107 to S111), which is performed when the process of determining whether to start the abnormality detection determines to start the object detection (NO in step S101), will be described. The process of steps S107 to S111 in the object detection process is the same as the process of steps S102 to S106 in the above abnormality detection process except for a part, and will be described below mainly on the differences.

First, the CPU 102 generates an input signal for causing the object detection ultrasonic wave to be transmitted (step S107, corresponding to step S102 of the abnormality detection process). The transmission time of the object detection ultrasonic wave is shorter than the transmission time of the abnormality detection ultrasonic wave.

Then, in order to detect the presence or absence of a waveform of the reflected wave 4, the CPU 102 obtains an output signal from the ultrasonic receiver 107 in a period in which the reflected wave 4 is to be received (step S108, corresponding to step S103 of the abnormality detection process).

Here, the period in which the reflected wave 4 is to be received is different from the period (step S103) in which the direct wave 5 is to be received, and is a period after the period in which the direct wave 5 is to be received. Specifically, the output signal obtained by the CPU 102 is an output signal after the time point when the direct wave propagation time, the time for which the direct wave 5 is present (which is equal to the transmission time of the object detection ultrasonic wave), and the internal processing time have elapsed since the time of transmission of the input signal. That is, the output signal in the period in which the reflected wave 4 is to be received is an output signal after the time point when the waveform of the direct wave 5 disappears from the output signal.

From another viewpoint, the above time point is determined as follows. The above time point is a time point when the start of the waveform of the reflected wave 4 reflected from an object 2 located at a minimum distance in the range in which the object detection device 100 can detect an object appears. Thus, the above time point is determined by obtaining a minimum reflected wave propagation time that is a time required from when the transmission wave 3 is transmitted to when the reflected wave 4 is received, from the minimum distance at which the object detection is possible and a sound speed that are determined at design time, and adding the internal processing time to the minimum reflected wave propagation time.

Also, since the length of the reflected wave 4 is equal to the length of the object detection ultrasonic wave, the length (duration) of the output signal read by the CPU 102 is from the above time point until at least a time equal to the transmission time of the object detection ultrasonic wave elapses, and a wider range of the output signal is obtained according to the range in which the object detection is performed. Specifically, the obtained range of the output signal is determined so that it includes the end of the waveform of the reflected wave 4 reflected from an object 2 located at a maximum distance in the range in which the object detection is possible. The obtained range (end) of the output signal is determined by obtaining a maximum reflected wave propagation time that is a time required from when the transmission wave 3 is transmitted to when the reflected wave 4 is received, from the maximum distance at which the object detection is possible and a sound speed that are determined at design time, and adding the transmission time of the object detection ultrasonic wave and the internal processing time to the maximum reflected wave propagation time.

Thus, the output signal obtained by the CPU 102 is an output signal from when the time determined based on the minimum distance of the object detection has elapsed since the transmission of the input signal to when the time determined based on the maximum distance of the object detection has elapsed since the transmission of the input signal.

Then, the CPU 102 obtains correlation values between the generated input signal and the above output signal and a cross-correlation function that is a set thereof (step S109, corresponding to step S104 of the abnormality detection process).

An equation for obtaining the correlation values is as follows, and different from the above equation (1) used in the abnormality detection process in τ and the integration interval:

$$R_{s,r}(\tau) = \int_0^{T_2} s(t) r(t+\tau) dt. \tag{2}$$

While $\tau_1$ used in the abnormality detection process is the time from the start of the waveform of the input signal to the start of the waveform of the abnormality detection output signal, and is a fixed value based on the distance between the ultrasonic transmitter 106 and the ultrasonic receiver 107, τ used in the object detection process is a variable. In obtaining the correlation values in the object detection process, as τ is varied, correlation values that are each an integrated value of the product of the input signal s(t) and the output signal r(t+τ) are sequentially calculated. To obtain the correlation values for the entire range of the output signal obtained in step S108, the minimum value of the variable τ is the sum of the minimum reflected wave propagation time and internal processing time. In other words, it is the sum of the direct wave propagation time, the time for which the waveform of the direct wave is present (equal to the transmission time of the object detection ultrasonic wave) and the internal processing time. The maximum value is the sum of the maximum reflected wave propagation time and the internal processing time.

A set of the correlation values thus sequentially obtained as T is varied is determined as the cross-correlation function.

The integration interval is from time zero to time $T_2$ when the transmission time of the object detection ultrasonic wave has elapsed. Since the transmission time of the object detection ultrasonic wave is shorter than that of the abnormality detection ultrasonic wave, $T_2$ is less than $T_1$ used in the abnormality detection process ($T_1 > T_2$).

Then, the CPU 102 determines whether there is a peak having a height (a magnitude of a correlation value) not less than the sixth threshold in the waveform of the cross-correlation function obtained in step S109 (step S110, corresponding to step S105 of the abnormality detection process). The sixth threshold is a threshold stored in the memory 103, and is a threshold for determining whether the output signal includes a waveform of the reflected wave 4. When the sixth threshold is set to a great value, it is possible to prevent erroneous detection due to noise in detecting an object 2 around the vehicle 1. Also, when it is set to a small value, it is possible to detect a small object 2, a low-reflectance object 2, or a distant object 2.

When the CPU 102 determines that there is a peak (YES in step S110), it obtains, from 1 corresponding to the peak of the cross-correlation function, an elapsed time from the transmission of the object detection ultrasonic wave by the ultrasonic transmitter 106 to the reception of the reflected wave 4 by the ultrasonic receiver 107, and calculates a distance to the object 2 from the elapsed time and the sound speed. Then, the CPU 102 generates a signal indicating the fact that an object 2 has been detected and the distance to the object 2, and transmits it to other control devices connected to the in-vehicle network (step S111, corresponding to step S106 of the abnormality detection process).

Here, since τ corresponding to the peak is a value equal to the time from the start of the input signal to the start of the waveform of the reflected wave 4, the above elapsed time can be calculated by subtracting the internal processing time from τ.

After determining that there is no peak (NO in step S110), and after generating the signal indicating the fact that an object 2 has been detected, and other information and transmitting it (step S111), the CPU 102 ends the object detection process, and repeats the process of the flow.

Here, a supplementary description will be made on the abnormality detection ultrasonic wave used in the abnormality detection process.

As aforementioned, the transmission time of the abnormality detection ultrasonic wave is longer than that of the object detection ultrasonic wave. This facilitates discrimination between the abnormality detection ultrasonic wave and a noise, such as the ultrasonic wave from the other vehicle, in the abnormality detection process.

An example of the lengths of the transmission times of the object detection ultrasonic wave and abnormality detection ultrasonic wave will be described.

As the object detection ultrasonic wave, an ultrasonic wave consisting of about one to a few cycles of a wave is used. The description using FIG. 2 has described an example of one cycle. Here, an example in which an ultrasonic wave consisting of four cycles of a wave is used will be descried as another example.

When the ultrasonic transmitter 106 is formed by a vibrator having a resonant frequency of 40 kHz and the object detection ultrasonic wave transmitted by the ultrasonic transmitter 106 consists of four cycles of a wave, the transmission time is 0.1 ms.

On the other hand, as the abnormality detection ultrasonic wave, an ultrasonic wave whose transmission time is longer than that of the object detection ultrasonic wave is used. The description using FIG. 2 has described an example in which the object detection ultrasonic wave is one cycle of a wave and the abnormality detection ultrasonic wave is two cycles of a wave.

When the ultrasonic transmitter is formed by a vibrator having a resonant frequency of 40 kHz and the abnormality detection ultrasonic wave transmitted by the ultrasonic transmitter consists of, for example, 4032 cycles of a wave, the transmission time is 100.8 ms, and about 1000 times the transmission time of the object detection ultrasonic wave (four cycles of a wave).

Also, the sum of the absolute values of amplitudes of the abnormality detection ultrasonic wave used in the first embodiment is greater than that of the object detection ultrasonic wave. This can increase the correlation value when the direct wave 5 is successfully received and improve the S/N ratio.

Also, the input signal generated in the abnormality detection process may be a signal obtained by the CPU 102 modulating a reference signal to superimpose a code thereon. The ultrasonic transmitter 106 uses the input signal to transmit an abnormality detection ultrasonic wave with the code superimposed thereon.

The CPU 102 reads the waveform of the reference signal (carrier wave) and the waveform of a modulation signal that are stored in the memory 103, and multiplies them to generate an input signal with a code superimposed thereon.

Figure 7:
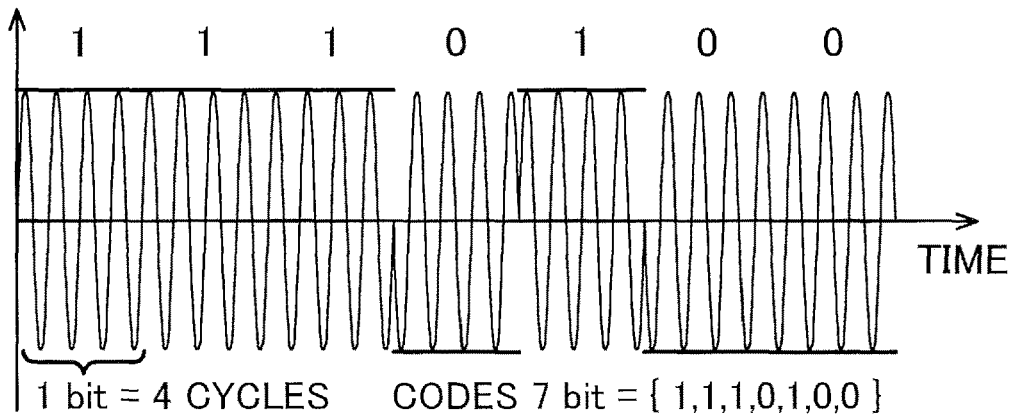
FIG. 7 is a diagram illustrating an example of the waveform of an abnormality detection ultrasonic wave according to the first embodiment of the present invention.

FIG. 7 is an example (28 cycles) of an input signal obtained by phase modulating a reference signal (carrier wave) to superimpose information of a predetermined code sequence thereon. In this example, information of a code sequence [1, 1, 1, 0, 1, 0, 0] is superimposed. The use of such an ultrasonic wave with codes superimposed thereon facilitates the discrimination from ultrasonic waves with no codes superimposed thereon from other vehicles or the like. The object detection ultrasonic wave in the object detection of the first embodiment is also an ultrasonic wave with no code superimposed thereon.

FIG. 7 illustrates an example of an input signal in which the number of bits is 7 and the number of cycles per bit is 4. The number of bits indicates the length of the code sequence, and the number of cycles per bit indicates the number of cycles used for representing one code. Thus, in the above example, 4 cycles are used for representing one code (1 or 0). Also, one input signal is generated by preparing 7 sets of four cycles (a wave whose total number of cycles is 28).

Another example of the input signal with information of a code sequence superimposed thereon may be a signal in which the number of bits is 63 and the number of cycles per bit is 64 (a wave whose total number of cycles is 4032).

The code sequence superimposed on the input signal may be an M code sequence, a Gold code sequence, or a Barker code sequence.

Also, although FIG. 7 illustrates an example of phase modulation, amplitude modulation or frequency modulation may be performed. Further, although it has been described that the CPU 102 multiplies the reference signal (carrier wave) by the modulation signal to generate the input signal, it is possible that a modulator is connected to the CPU 102 and caused to modulate the reference signal to generate the input signal. Also, when the ultrasonic transmitter 106 uses a piezoelectric element, no modulation is required, and it is only required to apply voltage to the ultrasonic transmitter 106 for a period corresponding to the transmission time.

Next, the process of determining whether to start the abnormality detection performed in step S101 of FIG. 6 will be described in detail with reference to the flowchart of FIG. 8.

The process of determining whether to start the abnormality detection of the object detection device 100 is performed by the determiner 121 of the control device 101. The control device 101 receives speed information items transmitted from the vehicle speed ECU 110 at the interface 104 and sequentially stores them in the memory 103. The determiner 121 uses the speed information items to determine whether to start the abnormality determination. Each speed information item includes the measurement time as well as the speed of the vehicle 1.

Upon the start of the process of step S101 (FIG. 6), the CPU 102 first obtains the latest speed information item and the preceding speed information item(s) from a predetermined time ago (step S131).

Specifically, the CPU 102 specifies the addresses in the memory 103 at which the speed information items whose measurement times are at or after a predetermined time are stored, and instructs the memory 103 to output the speed information items stored at the specified addresses, thereby reading the speed information items.

The CPU 102 calculates, from the read speed information items, the acceleration of the vehicle 1 at each measurement time (step S132).

The CPU 102 reads a third threshold from the memory 103 and determines whether the absolute values of all the calculated accelerations are not greater than the third threshold, which is a predetermined threshold (step S133). The third threshold is a threshold for determining whether a stop of the vehicle 1 is an emergency stop, and is a value that is compared to the absolute values of the accelerations. When the absolute values of the accelerations are greater than the third threshold, it is determined to be a high emergency stop, and when they are less than the third threshold, it is determined to be a low emergency stop.

When the absolute values of all the accelerations are not greater than the third threshold (YES in step S133), the CPU 102 determines whether the speed of the vehicle 1 indicated by the speed information items has remained not greater than a second threshold that is a predetermined threshold (step S134).

Specifically, the CPU 102 reads the second threshold from the memory 103. The second threshold is a threshold for determining whether the vehicle 1 is in a stopped state, and is a value that is compared to the speed of the vehicle 1. For example, when the state in which the speed is not greater than 3 km per hour should be determined to be the stopped state of the vehicle 1, a value greater than 3 km per hour is used as the second threshold.

Then, the CPU 102 determines whether the speeds of the vehicle 1 at all the measurement times read in step S131 are not greater than the second threshold. When the speeds at all the measurement times are not greater than the second threshold, the CPU 102 determines that the speed of the vehicle 1 has remained not greater than the second threshold.

When the speed has remained not greater than the second threshold (YES in step S134), the CPU 102 determines to start the abnormality detection (step S135), and starts the abnormality detection process starting from step S102 (FIG. 6).

When the condition that all the accelerations are not greater than the third threshold is not satisfied (NO in step S133), or when the condition that the speed has remained not greater than the second threshold is not satisfied (NO in step S134), the CPU 102 determines to start the object detection, and starts the object detection process starting from step S107 (FIG. 6).

A supplementary description will be made below on the process in which the object detection device 100 determines whether to start the abnormality detection.

First, it will be described why, when it is determined to start the abnormality detection (step S135), it is required that the speed of the vehicle 1 has remained not greater than the second threshold (step S134).

In the first embodiment, when the abnormality detection is performed, an ultrasonic wave whose transmission time is longer than that of the object detection ultrasonic wave is used as the abnormality detection ultrasonic wave. Thus, the abnormality detection process takes a longer time than the object detection process as the transmission time of the ultrasonic wave is longer. Also, since the object detection and abnormality detection use different ultrasonic waves, the object detection cannot be performed while the abnormality detection process is being performed. Thus, it is preferable that the abnormality detection process be performed in a stopped state lasting for a long time (e.g., 1 second or more) in which the object detection is not needed.

In view of the above, in the first embodiment, as a condition for starting the abnormality detection, it is required that the vehicle 1 be in the stopped state, and it is further required that the vehicle 1 remain in the stopped state for a long time.

The stopped state of the vehicle 1 includes not only the state in which the vehicle 1 is stopped completely (the state in which the speed is zero) but also the state in which the vehicle 1 is moving slightly (the speed is a few kilometers per hour). This is to include, in the stopped state, the case in which insufficient braking allows the vehicle 1 to move slightly.

Next, it will be described why, when it is determined to start the abnormality detection (step S135), it is required that the absolute values of the accelerations be not greater than the third threshold (step S133).

In a case in which the vehicle 1 makes an emergency stop, even when the vehicle 1 is in the stopped state for a long time after the emergency stop, an object 2 may exist around the vehicle 1 and periphery monitoring should be performed. In such a case, control for avoiding collision should be continued by the autonomous driving control device or collision avoidance device, and the object detection process should be continued. Thus, it is preferable to continue to perform the object detection process, instead of the abnormality detection process.

In view of the above, in the first embodiment, as a condition for starting the abnormality detection, it is required that no emergency stop be made by the vehicle 1.

Of the conditions in step S134 in the first embodiment, the condition that the speed of the vehicle 1 is not greater than the second threshold will be referred to as the vehicle stop condition.

The object detection device 100 and the control device 101 thereof according to the first embodiment of the present invention are configured as above, and provide the following advantages.

The object detection device 100 and the control device 101 thereof use, as the abnormality detection ultrasonic wave, an ultrasonic wave whose transmission time is longer than that of the object detection ultrasonic wave, in performing the abnormality detection.

While in general an ultrasonic wave having a short transmission time is used in performing object detection, since the object detection device 100 and the control device 101 thereof use an ultrasonic wave having a long transmission time as the abnormality detection ultrasonic wave, it is easy to discriminate between the abnormality detection ultrasonic wave and a noise, such as the ultrasonic wave from the other vehicle, in the abnormality detection process. Specifically, the correlation value between the input signal and the output signal generated based on a noise, such as the ultrasonic wave from the other vehicle, is not greater than that when the direct wave 5 is normally received. By taking advantage of the difference in magnitude between the correlation values, it is possible to discriminate between the abnormality detection ultrasonic wave and a noise, such as the ultrasonic wave from the other vehicle.

Thus, even when a noise, such as the ultrasonic wave from the other vehicle, is received in the period in which the direct wave 5 is to be received, it is possible to accurately detect an abnormality in the ultrasonic transmitter 106 or ultrasonic receiver 107.

Also, the object detection device 100 and the control device 101 thereof use, as the abnormality detection ultrasonic wave, an ultrasonic wave such that the sum of the absolute values of amplitudes of the ultrasonic wave is greater than that of the object detection ultrasonic wave, in performing the abnormality detection.

The magnitude of the correlation value between the input signal and the output signal is proportional to the sum of the absolute values of amplitudes of each signal. Thus, the use of an ultrasonic wave such that the sum of the absolute values of amplitudes of the ultrasonic wave is great can increase the correlation value and improve the S/N ratio. As a result, it is possible to use a great value as the first threshold, and prevent erroneous determination even under circumstances with great noise.

Also, the object detection device 100 and the control device 101 thereof can use, as the abnormality detection ultrasonic wave, an ultrasonic wave with a code superimposed thereon, in performing the abnormality detection.

The use of an ultrasonic wave with a code superimposed thereon facilitates the discrimination from a noise, such as the ultrasonic wave with no code superimposed thereon from the other vehicle. As a result, even when a noise, such as the ultrasonic wave from the other vehicle, is received in the period in which the direct wave 5 is to be received, it is possible to accurately detect an abnormality in the ultrasonic transmitter 106 or ultrasonic receiver 107.

Also, the object detection device 100 and the control device 101 thereof start the abnormality detection when the vehicle stop condition that the speed of the vehicle 1 is not greater than the second threshold is satisfied.

Since the object detection device 100 and the control device 101 thereof use the abnormality detection ultrasonic wave having a long transmission time, the abnormality detection process takes time as the transmission time is long. Also, since different ultrasonic waves are used as the object detection ultrasonic wave and abnormality detection ultrasonic wave, the object detection process and abnormality detection process cannot be performed simultaneously.

Since the object detection device 100 and the control device 101 thereof start the abnormality detection when the vehicle stop condition is satisfied, it is possible to start the abnormality detection process in a situation in which the vehicle 1 is in the stopped state, the object detection is not needed, and the time for the abnormality detection process can be ensured.

Thus, it is possible to ensure the time for the abnormality detection process during vehicle stop while performing the object detection process during traveling, in which the object detection is needed.

Also, the object detection device 100 and the control device 101 thereof start the abnormality detection when the absolute values of the accelerations of the vehicle 1 are not greater than the third threshold.

When the acceleration (deceleration) is great at the time of stop of the vehicle 1, it can be determined that the vehicle 1 is making an emergency stop. Since an emergency stop is made in a situation in which monitoring of the periphery of the vehicle 1 should be continued, the object detection around the vehicle 1 should be continued. The object detection device 100 and the control device 101 thereof start the abnormality detection when a stop has been made with small acceleration, and continue the object detection at the time of emergency stop.

Thus, at the time of emergency stop, it is possible to continue the object detection and improve the safety of the vehicle 1.

Modifications of the object detection device 100 and the control device 101 thereof according to the first embodiment of the present invention will be described.

When it is determined in step S101 of FIG. 6 that the abnormality detection is to be started, the object detection device 100 and the control device 101 thereof perform the abnormality detection process (steps S102 to S106) thereafter. However, it is possible to repeatedly perform the process of determining whether to start the object detection, as needed during the process of steps S102 to S106, and when it is determined to start the object detection, to interrupt the abnormality detection process and perform the object detection process (steps S107 to S111).

Thereby, during the abnormality detection process, when the vehicle 1 starts to move and in the process of determining whether to start the abnormality detection, it is determined to start the object detection, it is possible to start the object detection process promptly.

In the process of determining whether to start the abnormality detection, the object detection device 100 and the control device 101 thereof determine to start the abnormality detection, provided that the acceleration is not greater than the third threshold, that the speed is not greater than the second threshold, and that the speed remains not greater than the second threshold. It is not mandatory to use all these three conditions. It is possible to require that the acceleration be not greater than the third threshold and that the speed be not greater than the second threshold, and it is also possible to require only that the speed be not greater than the second threshold.

Second Embodiment

Next, the second embodiment of the present invention will be described. Description on parts that are the same as the configuration and operation described in the first embodiment will be omitted, and description will be made below on parts different from the first embodiment and parts that have not been described in the first embodiment.

In the first embodiment, in the process of determining whether to start the abnormality detection, it is determined to start the abnormality detection, provided that the acceleration be not greater than the third threshold, that the speed be not greater than the second threshold, and that the speed remain not greater than the second threshold.

In the second embodiment, in addition to the conditions in the first embodiment, it is determined whether the vehicle 1 will remain in the stopped state for a long time, by using information in front of the vehicle 1.

The configuration of the object detection device 100 and the control device 101 thereof of the second embodiment will be described.

Figure 4:
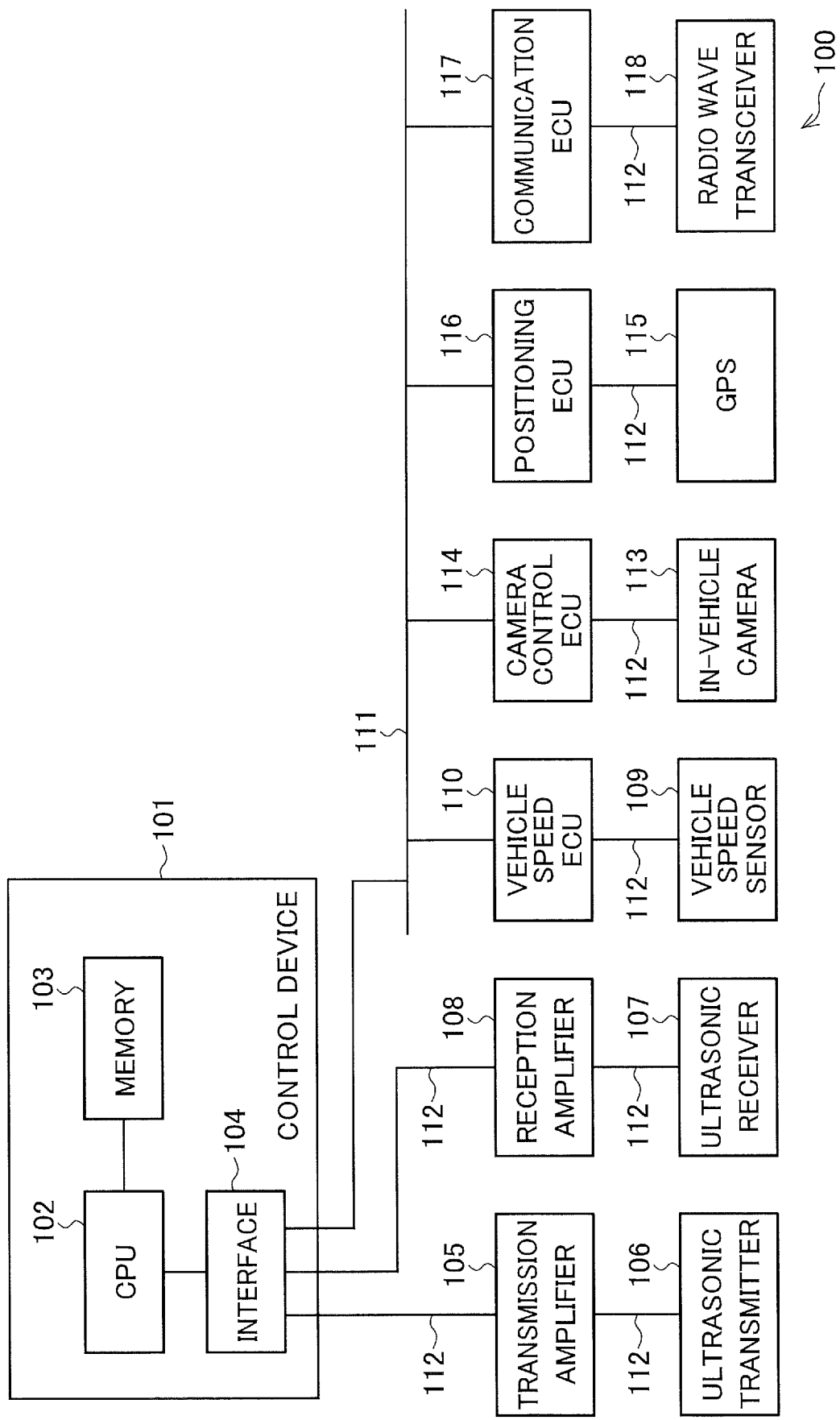
FIG. 4 is a diagram illustrating the hardware configuration of the object detection device according to the first embodiment of the present invention.
Figure 5:
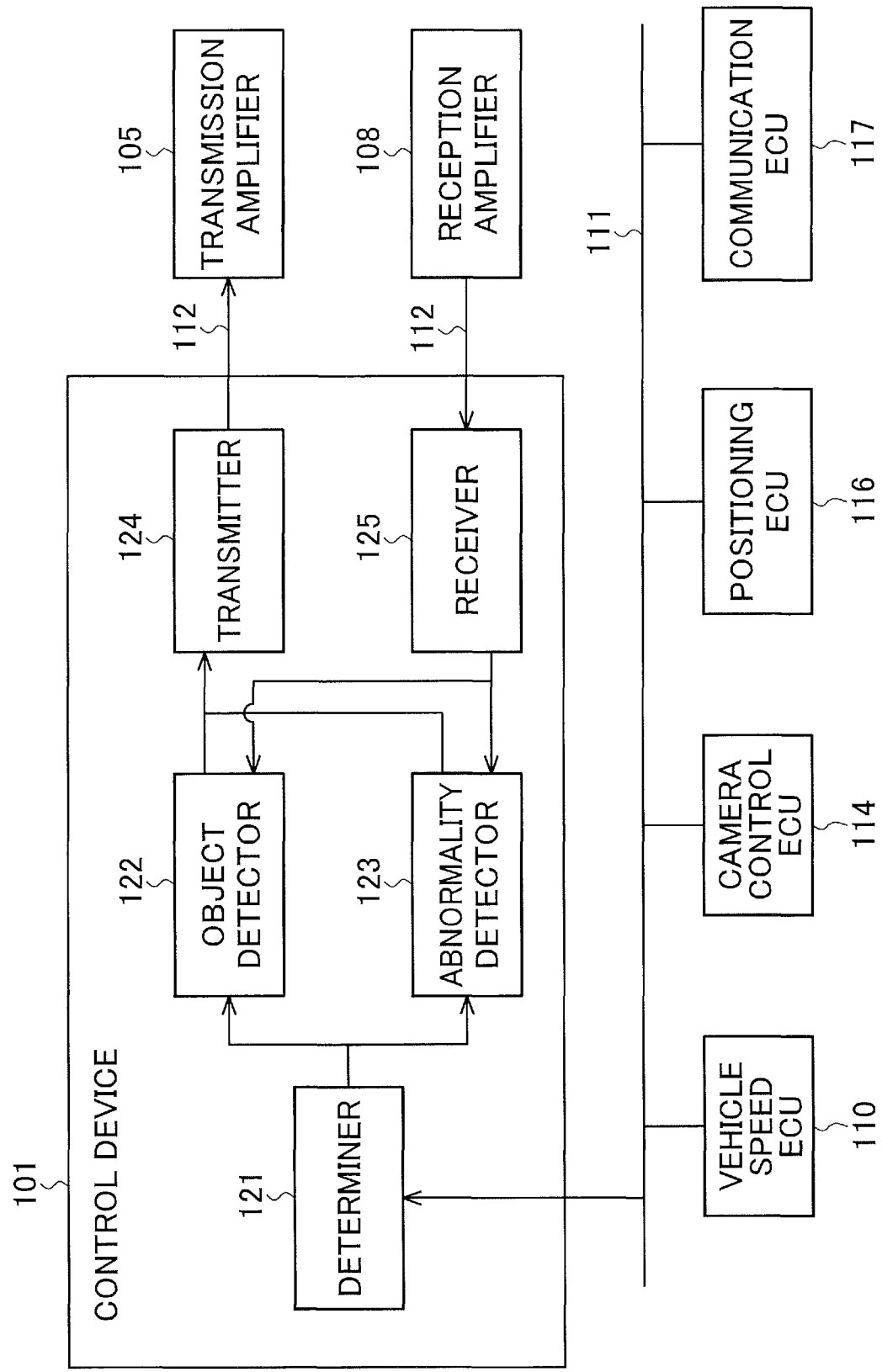
FIG. 5 is a diagram illustrating the configuration of a control device of the object detection device according to the first embodiment of the present invention.

The object detection device 100 of the second embodiment includes the in-vehicle camera 113 for capturing an image in front of the vehicle 1 and the camera control ECU 114 that controls the in-vehicle camera 113 (FIGS. 4 and 5).

The control device 101 receives image data in front of the vehicle 1 captured by the in-vehicle camera 113, via the camera control ECU 114, and determines whether the vehicle 1 will remain in the stopped state for a long time.

Each component will be described below.

The in-vehicle camera 113 is a component for capturing an image in front of the vehicle 1, which is information for the control device 101 to determine whether the vehicle 1 will remain in the stopped state for a long time.

The in-vehicle camera 113 is placed in the periphery of a windshield or a front grill in the vehicle so that it can capture an image in front of the vehicle 1. It periodically captures an image in front of the vehicle 1, and transmits the captured image data item to the camera control ECU 114 via the signal line 112. The image data item includes information indicating the capture time.

The camera control ECU 114 is a component for collecting the image data items from the in-vehicle camera 113, and transmitting them to the control device 101.

The camera control ECU 114 receives via the signal line 112 an image data item transmitted from the in-vehicle camera 113, converts the image data item into the CAN frame format, and transmits it to the control device 101 via the bus 111.

Also, the camera control ECU 114 transmits, to the in-vehicle camera 113, commands for start, stop, or period change of capturing, and controls the in-vehicle camera 113.

Next, the configuration of the control device 101 for receiving image data items and determining whether the vehicle 1 will remain in the stopped state for a long time.

The memory 103 constituting the control device 101 stores image data items in front of the vehicle 1 captured by the in-vehicle camera 113 for a given period. It also stores the capture times.

Also, the memory 103 constituting the control device 101 stores an image recognition program for recognizing a specific object 2 from an image captured by the in-vehicle camera 113. The CPU 102 can perform image recognition by reading and executing the image recognition program.

Next, the operation of the control device 101 of the second embodiment will be described with reference to the flowchart of FIG. 9 of a process of determining whether to start the abnormality detection. The process of determining whether to start the abnormality detection is performed by the determiner 121 of the control device 101.

Figure 8:
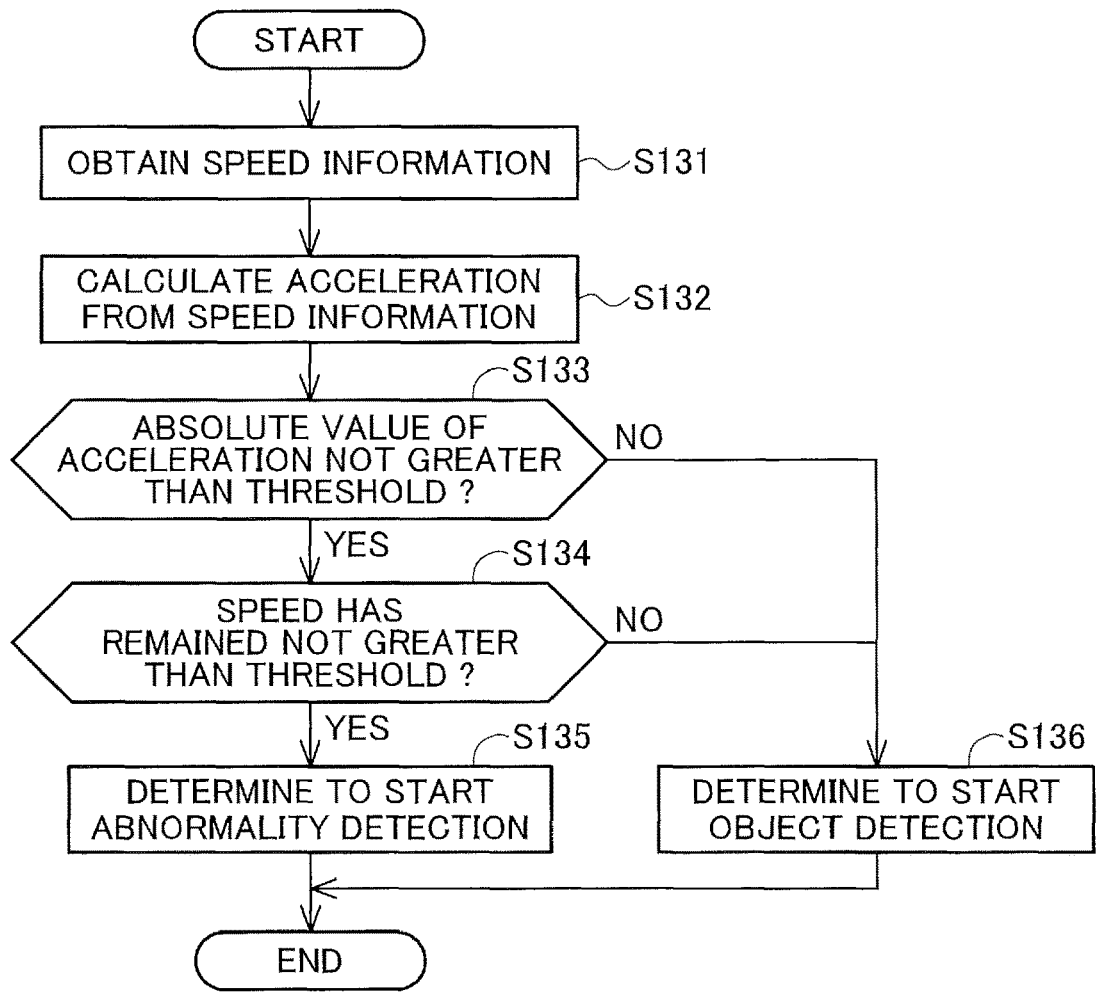
FIG. 8 is a flowchart of a process of determining whether to start abnormality detection of the object detection device according to the first embodiment of the present invention.

Of the process of determining whether to start the abnormality detection in the second embodiment, the process of steps S131 to S134, the process of step S135, and the process of step S136 are the same as those in the first embodiment (FIG. 8). The process of the second embodiment additionally includes the process of steps S201 to S204 following the process of step S134.

The additional process of steps S201 to S204 will be described.

Through the process until step S134, it is determined that the vehicle 1 has made no emergency stop (YES in step S133) and that the vehicle 1 has remained in the stopped state for a long time (YES in step S134).

Next, the CPU 102 of the control device 101 obtains temporally sequential image data items that are image data items in front of the vehicle 1 and include the image data item at the latest capture time (step S201).

Specifically, the CPU 102 specifies the addresses in the memory 103 of the image data items captured from a predetermined time before the current time, commands the memory 103 to output them, and reads the image data items from the memory 103.

Then, from the earliest of the capture times of images in which the signal of a traffic light has changed to a stop signal (red signal) and the capture time of an image at which the stop signal changed, the CPU 102 calculates a change period of the stop signal (step S202).

Specifically, the CPU 102 performs extraction of a traffic light included in each image data item read from the memory 103. A known method, such as pattern matching, is used for the image recognition.

Also, the CPU 102 determines whether the color of the signal of the extracted traffic light is red, from luminance information and color difference information of the image data item. Then, the CPU 102 determines the earliest of the capture times of temporally sequential images for which it is determined that the color of the signal is the stop signal (red signal), as a time when a change to the stop signal was made, determines the latest of the capture times as a time when the stop signal changed, and from the difference between these times, calculates the change period of the stop signal.

Then, the CPU 102 determines when the current stop signal started, on the basis of the capture times of the images. By using this capture time and the change period, the remaining time until the current stop signal changes is calculated (step S203).

Specifically, the CPU 102 adds the change period to the latest of the capture times of images at which it is determined that the color of the signal changed to a stop signal (red signal), thereby determining the time when the current stop signal will change, and from the difference between the time and the current time, calculates the remaining time.

Then, the CPU 102 determines whether the remaining time is not less than a seventh threshold that is a predetermined threshold (step S204). The seventh threshold is stored in the memory 103. The seventh threshold is a threshold for determining whether the vehicle 1 will remain in the stopped state for a long time, and is a threshold that is compared to the remaining time until the stop signal changes. For example, when the abnormality detection process takes a time of 1 second, a value not less than 1 second is used as the seventh threshold.

When the remaining time is not less than the seventh threshold (YES in step S204), the CPU 102 determines that the vehicle 1 will remain in the stopped state for a long time, and determines to start the abnormality detection (step S135).

When the remaining time is less than the seventh threshold (NO in step S204), the CPU 102 determines that the vehicle 1 will not remain in the stopped state for a long time, and determines to start the object detection (step S136).

After the process of step S135 or S136, the process of the flow ends, and the CPU 102 performs the abnormality detection process (steps S102 to S106) or object detection process (steps S107 to S111) of FIG. 6.

The object detection device 100 and the control device 101 thereof according to the second embodiment of the present invention are configured as above, and provide the following advantages.

In the second embodiment, in addition to the conditions in the first embodiment, by using information obtained from the in-vehicle camera 113 that captures an image in front of the vehicle 1, it is determined whether the vehicle 1 will remain in the stopped state for a long time at a stop signal. Thereby, it is possible to more accurately determine whether the vehicle 1 will remain in the stopped state for a long time, and ensure the time for the abnormality detection process during vehicle stop while performing the object detection process during traveling, in which the object detection is needed.

Modifications of the object detection device 100 and the control device 101 thereof according to the second embodiment of the present invention will be described.

The object detection device 100 and the control device 101 thereof compare the remaining time until the stop signal changes with the seventh threshold and determines that the vehicle 1 will remain in the stopped state for a long time. However, it is possible, when a signal included in the image data item at the capture time closest to the current time is a stop signal, to determine that the vehicle 1 will remain in the stopped state for a long time, and determine to start the abnormality detection.

Also, the object detection device 100 and the control device 101 thereof determine whether the vehicle 1 will remain in the stopped state for a long time, by using information in front of the vehicle 1, in addition to the conditions in the first embodiment that the acceleration is not greater than the third threshold, that the speed is not greater than the second threshold, and that the speed remains not greater than the second threshold. However, it is possible to make the determination by using only information in front of the vehicle 1 without using the conditions in the first embodiment, and it is also possible to make the determination by using some of the conditions in the first embodiment and information in front of the vehicle.

Also, using images captured by the in-vehicle camera 113, the object detection device 100 and the control device 101 thereof can not only determine that the vehicle 1 will remain in the stopped state for a long time because of a stop signal of a traffic light, but also determine that there is a traffic jam in front of the vehicle 1 and the vehicle 1 will remain in the stopped state for a long time.

Specifically, the memory 103 stores an eighth threshold. The eighth threshold is a threshold for determining whether the vehicle 1 will remain in the stopped state for a long time, and a threshold that is compared to the number of vehicles stopped ahead.

The CPU 102 obtains an image in front of the vehicle 1 (corresponding to step S201), recognizes vehicles stopped ahead, and determines the number of vehicles stopped ahead (referred to as stop information) (corresponding to steps S202 and S203). Then, the CPU 102 determines whether the number of vehicles stopped ahead is not less than the eighth threshold (corresponding to step S204). When the number of vehicles stopped ahead is not less than the eighth threshold, it is determined that there is a traffic jam, and it is determined to start the abnormality detection (corresponding to step S135). When it is less than the eighth threshold, it is determined that there is no traffic jam, and it is determined to start the object detection (corresponding to step S136).

Figure 9:
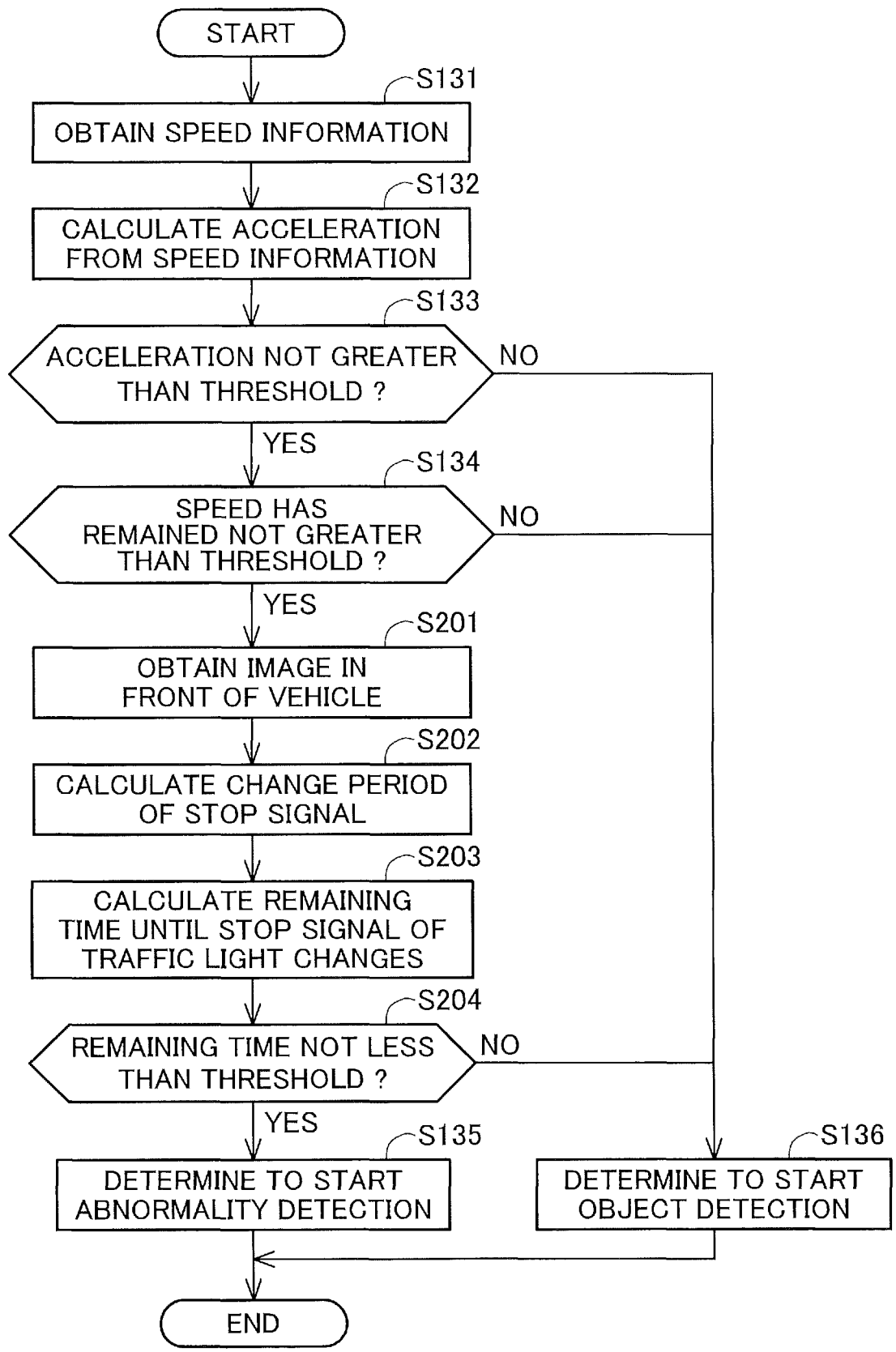
FIG. 9 is a flowchart of a process of determining whether to start abnormality detection of an object detection device according to a second embodiment of the present invention.

Also, in the second embodiment, as illustrated in FIG. 9, each time the process of determining whether to start the abnormality detection is performed, the change period of the stop signal is calculated (step S202). However, once the change period of a traffic light has been calculated, it is possible to store the change period in the memory 103, and calculate the remaining time by using the change period stored in the memory 103 (step S203) without performing the calculation process (step S202). This eliminates the need to repeatedly calculate the change period of the same traffic light each time the process of determining whether to start the abnormality detection is performed, for example, during a traffic jam, and improves the processing-efficiency.

Third Embodiment

Next, the third embodiment of the present invention will be described. Description on parts that are the same as the configuration and operation of the second embodiment will be omitted, and description will be made below on parts different from the second embodiment. The third embodiment can be used in combination with the second embodiment.

In the second embodiment, in addition to the conditions in the first embodiment, it is determined whether the vehicle 1 will remain in the stopped state for a long time, by using information obtained from the in-vehicle camera 113 that captures an image in front of the vehicle 1.

In the third embodiment, it is determined whether the vehicle 1 will remain in the stopped state for a long time, by using information obtained through communication with the outside of the vehicle 1, instead of information obtained from the in-vehicle camera 113 in the second embodiment.

The configuration of the object detection device 100 and the control device 101 thereof of the third embodiment will be described.

The object detection device 100 of the third embodiment includes the GPS positioning sensor 115 and positioning ECU 116 for generating position information of the vehicle 1, and the communication ECU 117 and radio wave transceiver 118 for communicating information with the outside of the vehicle 1 (FIGS. 4 and 5).

Each component will be described.

The GPS positioning sensor 115 is installed in the vehicle 1, and receives positioning signals from GPS satellites.

The positioning ECU 116 is connected to the GPS positioning sensor 115 via the signal line 112, and obtains the positioning signals received by the GPS positioning sensor 115.

The positioning ECU 116 calculates, from the obtained positioning signals, the latitude and longitude of the vehicle 1 as position information, and transmits the position information via the bus 111 to the communication ECU 117 and control device 101.

The communication ECU 117 obtains the position information of the vehicle 1 from the positioning ECU 116 via the bus 111. Then, it adds the position information to a signal for requesting traffic information to the outside, and transmits it to the radio wave transceiver 118 connected via the signal line 112.

Further, the communication ECU 117 obtains, from the radio wave transceiver 118, traffic information received by the radio wave transceiver 118 as a result of transmission of the signal for requesting traffic information. Then, it transmits the traffic information to the control device 101 connected via the bus 111.

Here, the traffic information includes position information of traffic lights located in front of the vehicle 1 and information indicating times when stop signals of the traffic lights change.

The radio wave transceiver 118 transmits the signal for requesting traffic information transmitted from the communication ECU 117, to the outside via radio waves, and receives radio waves carrying traffic information from the outside. Thus, it is located at a position where it can transmit and receive radio waves on the vehicle 1, and transmits and receives radio waves having a specific frequency according to a communication standard, such as 5G or LTE, or a frequency used in inter-vehicle communication.

The traffic information transmitted by the communication ECU 117 and the position information of the vehicle 1 transmitted by the positioning ECU 116 are sequentially stored and updated in the memory 103 constituting the control device 101 of the third embodiment.

Next, the operation of the control device 101 of the third embodiment will be described.

A process by the control device 101 of the third embodiment differs from the flowchart (FIG. 9) of the process of determining whether to start the abnormality detection of the second embodiment in steps S201, S202, and S203. These processes are performed by the determiner 121 of the control device 101.

The CPU 102 of the control device 101 of the third embodiment reads, from the memory 103, the position information of the vehicle 1 and the position information of the traffic lights included in the traffic information, calculates the distances between the vehicle 1 and the traffic lights, and determines the traffic light closest to the vehicle 1. Also, the CPU 102 reads, from the memory 103, the time when the stop signal of the determined traffic light will change (corresponding to step S201 of FIG. 9).

Further, the CPU 102 calculates a remaining time that is the difference between the read time when the stop signal will change and the current time (corresponding to steps S202 and S203 of FIG. 9).

The subsequent process is the same as in the second embodiment. It is determined whether the remaining time is not less than the seventh threshold, and when it is not less than the seventh threshold, it is determined to start the abnormality detection, and when it is less than the seventh threshold, it is determined to start the object detection (steps S204, S135, and S136).

The object detection device 100 and the control device 101 thereof according to the third embodiment of the present invention are configured as above, and provide the following advantages.

In the third embodiment, in addition to the conditions in the first embodiment, it is determined whether the vehicle 1 will remain stopped for a long time at a stop signal, by using information obtained through communication with the outside of the vehicle 1.

Thereby, it is possible to more accurately determine whether the vehicle 1 will remain in the stopped state for a long time, and ensure the time for the abnormality detection process during vehicle stop while continuing the object detection process during traveling, in which the object detection is needed.

Modifications of the object detection device 100 and the control device 101 thereof according to the third embodiment of the present invention will be described.

The object detection device 100 and the control device 101 thereof determine whether the vehicle 1 will remain in the stopped state for a long time, by using information obtained through communication with the outside of the vehicle 1, in addition to the conditions in the first embodiment that the acceleration is not greater than the third threshold, that the speed is not greater than the second threshold, and that the speed remains not greater than the second threshold. However, it is possible to make the determination by using only information obtained through communication with the outside of the vehicle 1 without using the conditions in the first embodiment, and it is also possible to make the determination by using some of the conditions in the first embodiment and information in front of the vehicle.

Using information obtained by the communication ECU 117, the object detection device 100 and the control device 101 thereof can not only determine that the vehicle 1 will remain in the stopped state for a long time because of a stop signal of a traffic light, but also determine that there is a traffic jam in front of the vehicle 1 and the vehicle 1 will remain in the stopped state for a long time.

Specifically, the memory 103 of the control device 101 stores an eighth threshold. The eighth threshold is a threshold for determining whether the vehicle 1 will remain in the stopped state for a long time, and is a threshold that is compared to the number of vehicles stopped ahead.

Also, for other vehicles ahead, the communication ECU 117 generates a signal for requesting to transmit an information item indicating whether the other vehicle is stopped, transmits it through the radio wave transceiver 118, and performs inter-vehicle communication. Then, the communication ECU 117 receives, from the other vehicles via the radio wave transceiver 118, information items indicating whether the other vehicle is stopped, and transmits them to the control device 101.

The control device 101 stores, in the memory 103, the information items indicating whether the other vehicle is stopped received from the communication ECU 117.

The CPU 102 of the control device 101 reads, from the memory 103, the information items indicating whether the other vehicle is stopped (corresponding to step S201 of FIG. 9), and determines, from the information items, the number of vehicles stopped ahead (referred to as stop information) (corresponding to steps S202 and S203). Then, the CPU 102 determines whether the number of vehicles stopped ahead is not less than the eighth threshold (corresponding to step S204). When the number of vehicles stopped ahead is not less than the eighth threshold, it is determined that there is a traffic jam, and it is determined to start the abnormality detection (corresponding to step S135). When it is less than the eighth threshold, it is determined that there is no traffic jam, and it is determined to start the object detection (corresponding to step S136).

Fourth Embodiment

Next, a fourth embodiment of the present invention will be described. Description on parts that are the same as the configuration and operation of the first embodiment will be omitted, and description will be made below on parts different from the first embodiment. The fourth embodiment can be used in combination with the second and third embodiments.

In the first embodiment, it is determined whether the abnormality detection output signal includes a signal of the direct wave 5, and when no signal of the direct wave 5 is included, it is determined that the ultrasonic transmitter 106 or ultrasonic receiver 107 is in the abnormal state.

The object detection device 100 and the control device 101 thereof of the fourth embodiment detects, when no signal of the direct wave 5 can be detected, which of the ultrasonic transmitter 106 and ultrasonic receiver 107 has an abnormality, by using the intensity of noise received by the ultrasonic receiver 107.

The configuration of the object detection device 100 and the control device 101 thereof of the fourth embodiment will be described.

The memory 103 of the control device 101 of the fourth embodiment stores a program for calculating the intensity of noise received by the ultrasonic receiver and detecting an abnormality in the ultrasonic transmission/reception unit, and the CPU 102 of the control device 101 reads and executes the program.

Next, the operation of the object detection device 100 and the control device 101 thereof of the fourth embodiment will be described with reference to FIG. 10, which is a flowchart illustrating part of the abnormality detection process.

Figure 10:
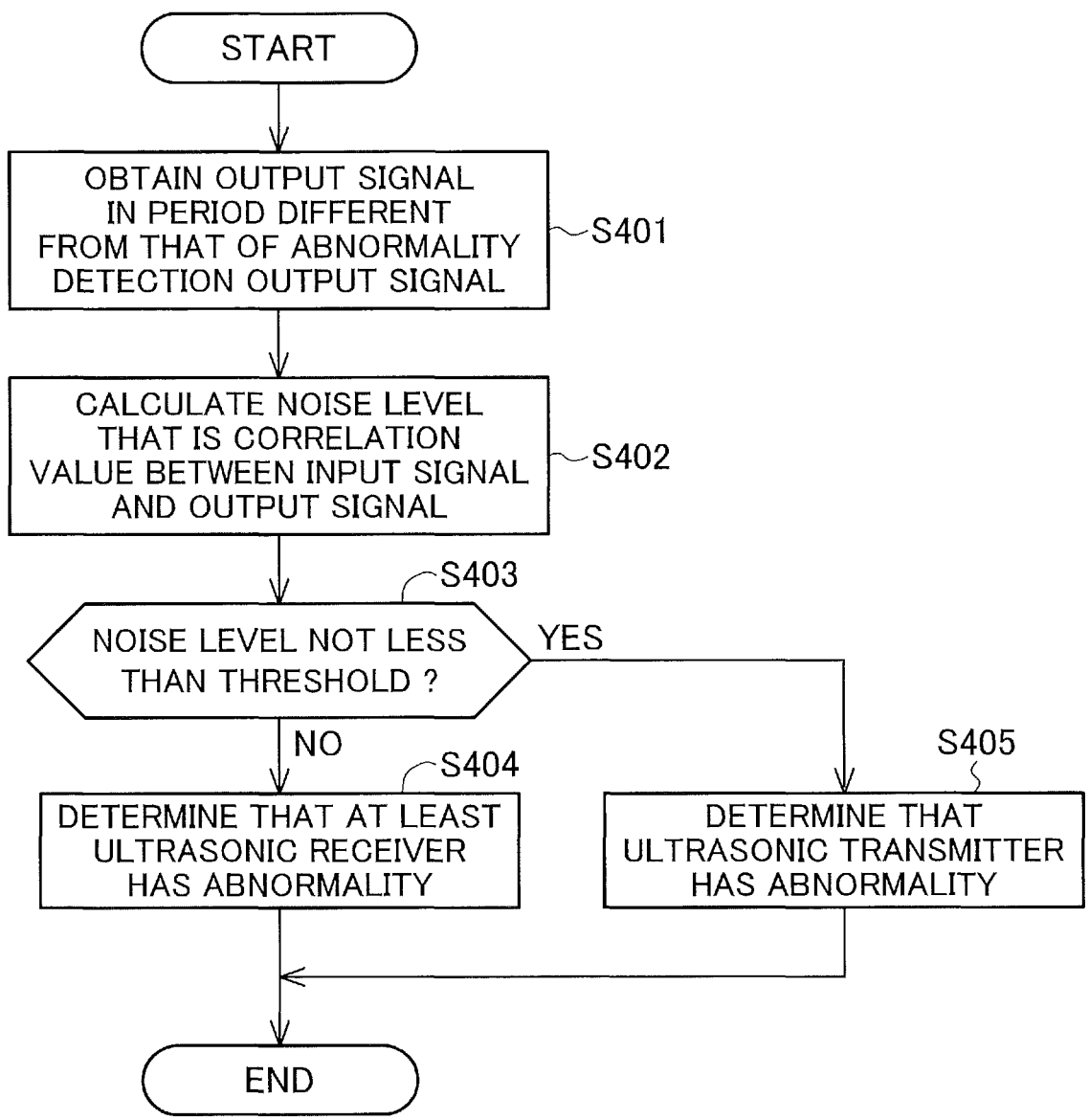
FIG. 10 is a flowchart illustrating a part of an abnormality detection process of an object detection device according to a fourth embodiment of the present invention.

The process illustrated in the flowchart of FIG. 10 is a process inserted between steps S105 and S106 of FIG. 6.

When the correlation value between the input signal and the abnormality detection output signal is not greater than the first threshold and no signal of the direct wave 5 is detected in step S105 (FIG. 6), there is an abnormality in the ultrasonic transmitter 106 or ultrasonic receiver 107. In the fourth embodiment, by performing the process of steps S401 to S405 of FIG. 10, the CPU 102 uses a noise intensity to detect which of the ultrasonic transmitter 106 and ultrasonic receiver 107 has an abnormality.

The CPU 102 obtains the output signal in a period different from that of the abnormality detection output signal (step S401).

Specifically, the CPU 102 reads a part of the output signal from the ultrasonic receiver 107 stored in the memory 103 in a period before or after the period in which the waveform of the direct wave 5 is present. The length of the read output signal is equal to the length (duration) of the transmission time of the abnormality detection ultrasonic wave. The process of step S401 is the same as step S103 of FIG. 6 except for the period of the read output signal.

The CPU 102 obtains a correlation value between the input signal and the output signal, and calculates the absolute value thereof as a noise level (step S402). The noise level indicates the intensity of noise. The process of calculating the correlation value is the same as that of step S104 of FIG. 6.

Next, the CPU 102 determines whether the noise level is not less than a fourth threshold read from the memory 103 (step S403). The fourth threshold is a threshold for determining whether the output signal includes noise, and is a threshold that is compared to the noise level calculated by the CPU 102.

When the noise level is not less than the fourth threshold (YES in step S403), since the ultrasonic receiver 107 can receive ultrasonic waves, the CPU 102 determines that out of the ultrasonic transmitter 106 and ultrasonic receiver 107, the ultrasonic transmitter 106 is abnormal (step S405). When the noise level is less than the fourth threshold (NO in step S403), since the ultrasonic receiver 107 can receive no ultrasonic wave, the CPU 102 determines that at least the ultrasonic receiver 107 is abnormal (step S404).

After completion of these processes, the CPU 102 performs the process of step S106 of FIG. 6. Specifically, when it is determined that the ultrasonic transmitter 106 is abnormal (step S405), the CPU 102 generates a signal indicating that the ultrasonic transmitter 106 is abnormal, and transmits it to other control devices via the interface 104.

When the noise level is less than the fourth threshold, the CPU 102 generates a signal indicating that at least the ultrasonic receiver 107 is abnormal, and transmits it to other control devices via the interface 104.

The following describes a method of, when the ultrasonic transmission/reception unit includes multiple ultrasonic transmitters 106 and multiple ultrasonic receivers 107, efficiently determining failed ultrasonic transmitters 106 and ultrasonic receivers 107, by using the above abnormality detection process.

The following description assumes that the ultrasonic transmitters 106 and ultrasonic receivers 107 included in the ultrasonic transmission/reception unit are ultrasonic transceivers 401 having a transmission function and a reception function, and the ultrasonic transmission/reception unit includes three ultrasonic transceivers 401.

First, the configuration of the object detection device 100 will be described with reference to FIG. 11, which illustrates that the three ultrasonic transceivers 401 are connected to the control device 101.

Each ultrasonic transceiver 401 is connected to a transmission amplifier 105 and a reception amplifier 108 via signal lines 112, and each of the transmission amplifiers 105 and reception amplifiers 108 is connected to the control device 101 via a signal line 112. Input signals transmitted from the control device 101 are amplified by the transmission amplifiers 105 and transmitted to the ultrasonic transceivers 401. Also, the ultrasonic transceivers 401 generate output signals and transmit them to the reception amplifiers 108. The output signals are amplified by the reception amplifiers 108 and transmitted to the control device 101.

Also, the ultrasonic transceivers 401 are provided on an outer surface of the vehicle 1, and located at positions where they can receive transmission waves 3 transmitted by the respective ultrasonic transceivers 401.

The components, such as the vehicle speed ECU 110, connected to the control device 101 via the bus 111 are the same as those of the first embodiment (see FIG. 4), although illustration thereof is omitted.

Figure 11:
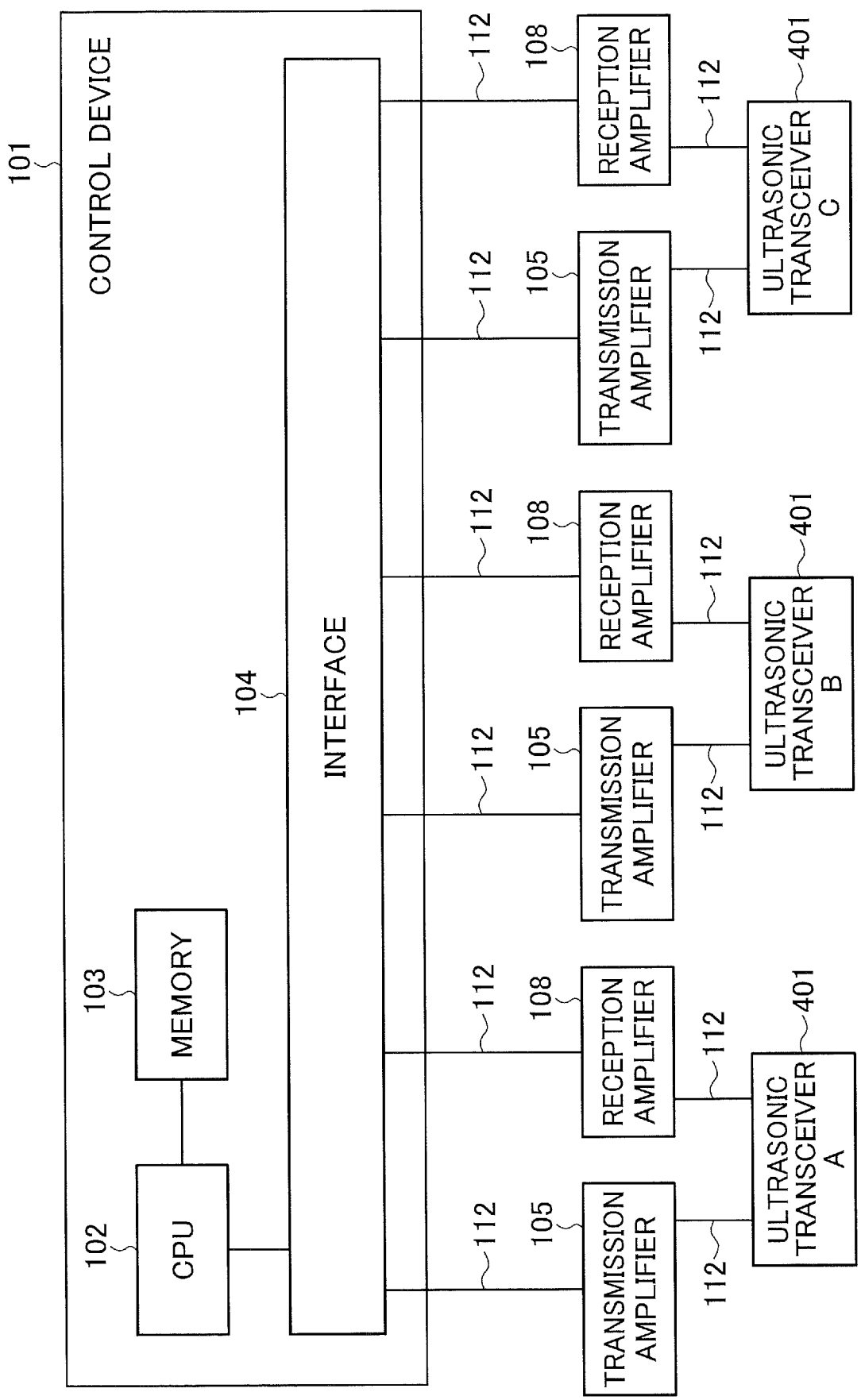
FIG. 11 is a diagram illustrating the hardware configuration of the object detection device according to the fourth embodiment of the present invention.

Also, as described in FIG. 11, the three ultrasonic transceivers 401 will be referred to as ultrasonic transceiver A, ultrasonic transceiver B, and ultrasonic transceiver C.

FIG. 12 is a table showing a relationship between results of the abnormality detection process by the object detection device 100 according to the fourth embodiment of the present invention and abnormal parts, in the case of using the three ultrasonic transceivers 401. A method of determining failed ultrasonic transceivers 401 will be described with reference to FIG. 12.

There are eight patterns of combinations of the normal and failure states of the three ultrasonic transceivers 401, as shown in the row of "states of ultrasonic transceivers" of FIG. 12.

Also, the row of "determination results" of FIG. 12 shows, for each pattern, whether the correlation value between the input signal and the abnormality detection output signal is not less than the first threshold and whether the noise level is not less than the fourth threshold. The expression "A to B" refers to a determination result when an ultrasonic wave is transmitted from ultrasonic transceiver A and received by ultrasonic transceiver B. The case where the correlation value is not less than the first threshold is expressed by "a"; the case where the correlation value is less than the first threshold and the noise level is not less than the fourth threshold is expressed by "b"; the case where the correlation value is less than the first threshold and the noise level is less than the fourth threshold is expressed by "c".

Each pattern will be described. First, in the case where an ultrasonic wave is transmitted from ultrasonic transceiver A and ultrasonic waves are received by ultrasonic transceivers B and C, when at least one of "A to B" and "A to C" is "a" (patters 1 to 3), it can be determined which of the ultrasonic transceivers 401 have an abnormality, by only the single transmission of the ultrasonic wave. Since at least one of the results of the ultrasonic transmission/reception is "a", ultrasonic transceiver A is normal. Thus, when there is a result of "c", the cause lies in the ultrasonic transceivers 401 for receiving ultrasonic waves. Thus, it can be determined that the ultrasonic transceiver 401 for receiving ultrasonic waves in the case of the result of "c" is failed.

Also, likewise, in the case where an ultrasonic wave is transmitted from ultrasonic transceiver A and ultrasonic waves are received by ultrasonic transceivers B and C, when neither "A to B" nor "A to C" is "a" and at least one of "A to B" and "A to C" is "b" (patterns 5 to 7), it can be determined which of the ultrasonic transceivers 401 have an abnormality, by only the single transmission of the ultrasonic wave. Since, in each case, at least one of the ultrasonic transceivers 401 for receiving ultrasonic waves receives noise (at least one of "A to B" and "A to C" is "b"), it can be determined that although the at least one ultrasonic transceiver 401 for receiving ultrasonic waves is normal, the ultrasonic transceiver 401 for transmitting an ultrasonic wave fails to normally transmit an ultrasonic wave. Thus, it can be determined that ultrasonic transceiver A is failed. Also, when ultrasonic transceiver(s) 401 for receiving ultrasonic waves can receive noise, it can be determined that the ultrasonic transceiver(s) 401 capable of reception are normal.

Further, likewise, in the case where an ultrasonic wave is transmitted from ultrasonic transceiver A and ultrasonic waves are received by ultrasonic transceivers B and C, when "A to B" and "A to C" are both "c" (patterns 4 and 8), it is not possible to determine whether it is pattern 4 or 8, only by the single transmission of the ultrasonic wave. That is, it is unclear whether ultrasonic transceiver A is normal. In this case, in addition, an ultrasonic wave is transmitted from ultrasonic transceiver B (or ultrasonic transceiver C) to ultrasonic transceiver A, and it is determined whether ultrasonic transceiver A receives noise. When noise is received ("B to A" is "b"), it can be determined that only ultrasonic transceiver A is normal, and when no noise is received ("B to A" is "c"), it can be determined that all the ultrasonic transceivers 401 are failed.

The object detection device 100 and the control device 101 thereof according to the fourth embodiment of the present invention are configured as above, and provide the following advantages.

In the fourth embodiment, in addition to the conditions in the first embodiment, the abnormality detection of the ultrasonic transmission/reception unit is performed by using the noise level.

When the correlation value is not greater than the first threshold and the noise level is not less than the fourth threshold, it can be determined that there is no abnormality in the ultrasonic receiver 107 and there is an abnormality in the ultrasonic transmitter 106. Also, when the noise level is less than the fourth threshold, it can be determined that there is an abnormality in at least the ultrasonic receiver 107.

Also, when an ultrasonic transmitter 106 or ultrasonic receiver 107 that adversely affects safe driving is abnormal, it is possible to stop autonomous travel using the ultrasonic transmission/reception unit or issue an alert in the vehicle. Conversely, when an ultrasonic transmitter 106 or ultrasonic receiver 107 that does not adversely affect safe driving is abnormal, it is possible to continue autonomous driving by using other ultrasonic transmitter 106 and ultrasonic receiver 107, other sensors, or the like.

Also, when abnormality detection is performed on multiple ultrasonic transceivers 401, it is possible to determine abnormal parts with a small number of transmissions, by performing determination based on the noise level.

Modifications of the object detection device 100 and the control device 101 thereof according to the fourth embodiment of the present invention will be described.

Although FIG. 12 shows an example of determining failures of the ultrasonic transceivers 401, it is possible to set the first threshold and fourth threshold to be higher and make determination of the abnormal states, instead of the failure states.

Although in the process of step S401 of FIG. 10, the CPU 102 obtains a part of the output signal in a period different from that of the abnormality detection output signal and obtains the correlation value, it may further obtain part(s) of the output signal in other period(s), obtain other correlation value(s), and take an average of the absolute values of the obtained correlation values to determine it as a noise level. As the average, a median as well as an arithmetic mean may be used.

In this case, the average N, which is the noise level, can be calculated according to the following equation by using the correlation values $R_n$ based on the output signals in the multiple periods. Although each $R_n$ is calculated by using the above equation (1), $\tau_1$ used at this time varies between the obtained output signals. The time from the start of the waveform of the input signal to the start of the waveform of each output signal is used as $\tau_1$.

$$N = \frac{\sum_{i=1}^{n} R_n}{n} \quad (3)$$

Here, n is the number of the correlation values.

Also, in the process of step S401 of FIG. 10, the CPU 102 obtains a part of the output signal in a period different from that of the abnormality detection output signal and obtains the correlation value, the length of the obtained output signal being equal to the length (duration) of the transmission time of the abnormality detection ultrasonic wave. However, the CPU 102 may obtain, in a different period, a part of the output signal whose duration is longer than the length (duration) equal to the transmission time of the abnormality detection ultrasonic wave. Then, it may obtain a cross-correlation function as described in the object detection process (step S109 of FIG. 6). It is possible to take an average of the absolute values of amplitude values of the obtained cross-correlation function to determine it as a noise level. The correlation values constituting the cross-correlation function are calculated by using the above equation (2). The minimum value of the variable T used at this time is equal to the time from the start of the waveform of the input signal to the start of the waveform of the output signal. The maximum value is equal to a value obtained by subtracting the transmission time of the abnormality detection ultrasonic wave from the time from the start of the waveform of the input signal to the end of the waveform of the output signal. Also, the integration interval is determined to be equal to the length of the transmission time of the abnormality detection ultrasonic wave.

Fifth Embodiment

Next, a fifth embodiment of the present invention will be described. Description on parts that are the same as the configuration and operation of the fourth embodiment will be omitted, and description will be made below mainly on parts different from the fourth embodiment. The fifth embodiment can be used in combination with the second, third, and fourth embodiments.

In the fourth embodiment, in a case where no signal of the direct wave 5 can be detected, when the noise level received by the ultrasonic receiver 107 is not less than the fourth threshold, it is determined that there is an abnormality in the ultrasonic transmitter 106. However, when the noise intensity is unstable due to the effect of the external environment, it is conceivable that the abnormality detection cannot be performed accurately.

In the fifth embodiment, the object detection device 100 includes multiple ultrasonic transceivers 401 as with FIG. 11, and when no signal of the direct wave 5 can be detected, the object detection device 100 determines whether noise levels received by multiple ultrasonic receivers 107 are equal. When the noise levels are equal, the ultrasonic transceivers 401 for receiving ultrasonic waves are in the same state, and when the noise levels are not equal, the ultrasonic transceivers 401 for receiving ultrasonic waves are not in the same state. Thus, by comparing the noise levels, it is possible to obtain information regarding the states of the ultrasonic transceivers 401 for receiving ultrasonic waves. By using this information, it is determined which of the ultrasonic transceivers 401 have an abnormality.

The configuration of the object detection device 100 and the control device 101 thereof of the fifth embodiment will be described.

The object detection device 100 of the fifth embodiment includes three ultrasonic transceivers 401 that are ultrasonic transmission/reception units. The three ultrasonic transceivers 401 are installed in the vehicle so that each ultrasonic transceiver 401 can receive an ultrasonic wave transmitted from each ultrasonic transceiver 401. The configuration of the ultrasonic transmission/reception units is the same as the configuration described in the fourth embodiment with reference to FIG. 11.

The following describes a configuration different from the configuration of the object detection device 100 of the fourth embodiment.

The memory 103 in the fifth embodiment stores a program for comparing noise levels received by two ultrasonic transceivers 401, and the CPU 102 of the control device 101 reads the program from the memory 103 and executes it.

Next, the operation of the object detection device 100 and the control device 101 thereof of the fifth embodiment will be described.

Figure 13:
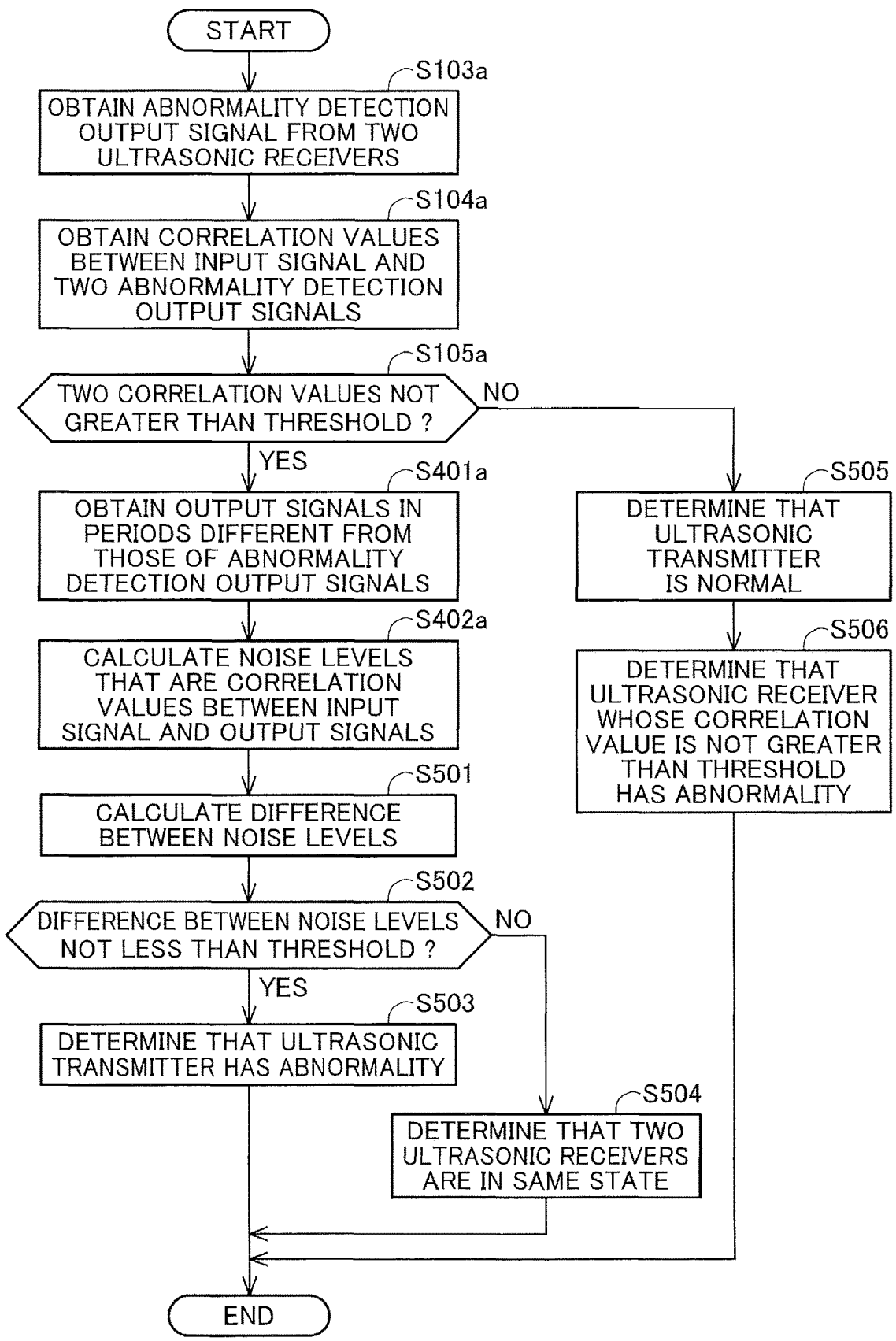
FIG. 13 is a flowchart illustrating a part of an abnormality detection process of an object detection device according to a fifth embodiment of the present invention.

FIG. 13 is a flowchart illustrating the abnormality detection process by the object detection device 100 of the fifth embodiment, and is a process inserted between steps S102 and S106 of FIG. 6 instead of steps S103 to S105. Of the processes in the flowchart illustrated in FIG. 13, for steps having processing contents in common with the flowchart of FIG. 6 or the flowchart of FIG. 10, the corresponding steps of FIG. 6 or 10 will be indicated, and description on the common processing contents will be omitted.

The object detection device 100 of the fifth embodiment includes the three ultrasonic transceivers 401, and performs the abnormality detection process by transmitting an ultrasonic wave from one of the ultrasonic transceivers 401 and receiving ultrasonic waves by the nearby two ultrasonic transceivers 401.

Thus, in step S103a, the CPU 102 obtains abnormality detection output signals from the two ultrasonic transceivers 401 (corresponding to step S103 of FIG. 6).

In the flowchart of FIG. 13, the ultrasonic transceivers 401 serving to receive ultrasonic waves are simply described as "ultrasonic receivers", and the ultrasonic transceiver 401 serving to transmit an ultrasonic wave is described as "ultrasonic transmitter".

Next, the CPU 102 calculates two correlation values corresponding to the two ultrasonic transceivers 401 (step S104a, corresponding to step S104 of FIG. 6).

Then, the CPU 102 compares each of the two correlation values corresponding to the two ultrasonic transceivers 401 with the first threshold (step S105a, corresponding to step S105 of FIG. 6). When at least one of the two correlation values is greater than the first threshold (NO in step S105a), since at least the ultrasonic transceivers 401 for transmitting an ultrasonic wave normally transmits an ultrasonic wave, the CPU 102 determines that the ultrasonic transceiver 401 for transmitting an ultrasonic wave is normal (step S505). Also, when one of the two correlation values is not greater than the first threshold, it is determined that the ultrasonic transceiver 401 for receiving ultrasonic waves corresponding to the correlation value not greater than the first threshold is abnormal (step S506).

When both the correlation values are not greater than the first threshold (YES in step S105a), since it cannot be determined whether the ultrasonic transceiver 401 for transmitting an ultrasonic wave or the two ultrasonic transceivers 401 for receiving ultrasonic waves is abnormal, the processes starting from step S401a, which will be described below, are performed.

In step S401a, the CPU 102 obtains, from each of the two ultrasonic transceivers 401 for receiving ultrasonic waves, a part of the output signal in a period different from that of the abnormality detection output signal (corresponding to step S401 of FIG. 10). Further, in step S402a, the CPU 102 calculates two correlation values corresponding to the two ultrasonic transceivers 401 and determines them as noise levels of the respective ultrasonic transceivers 401 (corresponding to step S402 of FIG. 10).

In the fourth embodiment, a comparison is made between the noise level and the fourth threshold (step S403 of FIG. 10). However, in the fifth embodiment, the CPU 102 performs a subtraction between the two noise levels corresponding to the two ultrasonic transceivers 401 for receiving ultrasonic waves to calculate a difference therebetween (step S501).

Then, the CPU 102 determines whether the difference between the noise levels is not less than a fifth threshold read from the memory 103 (step S502). The fifth threshold is a threshold for determining whether the noise levels of the two ultrasonic transceivers 401 are equal, and is a threshold that is compared to the difference between the noise levels of the two ultrasonic transceivers 401. When the difference between the noise levels is less than the fifth threshold, it is determined that the noise levels are equal, and when it is not less than the fifth threshold, it is determined that the noise levels are not equal.

When the difference between the noise levels is not less than the fifth threshold (YES in step S502), the CPU 102 determines that there is an abnormality in one of the two ultrasonic transceivers 401 for receiving ultrasonic waves. Then, since at least one of the ultrasonic transceivers 401 is normal and in a state in which it can normally receive ultrasonic waves, the CPU 102 determines that there is an abnormality in the ultrasonic transceiver 401 for transmitting an ultrasonic wave (step S503).

On the other hand, when the difference between the noise levels is less than the fifth threshold (NO in step S502), it is determined that the two ultrasonic transceivers 401 for receiving ultrasonic waves are in the same state (step S504).

After that, one of the two ultrasonic transceivers 401 that served to receive ultrasonic waves is assigned to transmission of an ultrasonic wave, the other two ultrasonic transceivers 401 are assigned to reception, and the process of the flowchart of FIG. 13 is repeated. Thereby, it is determined which of the ultrasonic transceivers have an abnormality.

Here, with reference to FIG. 14, it will be shown that by repeating the above process, it can be determined which of the ultrasonic transceivers 401 have an abnormality.

For convenience of description, as with the fourth embodiment, the three ultrasonic transceivers 401 included in the ultrasonic transmission/reception unit will be referred to as ultrasonic transceiver A, ultrasonic transceiver B, and ultrasonic transceiver C (FIG. 11).

FIG. 14 is a table showing a relationship between results of the abnormality detection process by the object detection device 100 according to the fifth embodiment of the present invention and abnormal parts.

There are eight patterns of combinations of "normal" and "abnormal" states of the three ultrasonic transceivers 401, as shown in the row of "states of ultrasonic transceivers" of FIG. 14.

Also, the row of "determination results" of FIG. 14 shows, for each pattern, whether the correlation value between the input signal and the abnormality detection output signal is not less than the first threshold and whether the difference between the noise levels is not less than the fifth threshold. The expression "A to B" refers to a determination result when an ultrasonic wave is transmitted from ultrasonic transceiver A and received by ultrasonic transceiver B. The case where the correlation value between the input signal and the abnormality detection output signal is not less than the first threshold is expressed by "a"; when "A to B" is "a", it indicates that the correlation value is not less than the first threshold and the direct wave 5 is detected. Also, the case where the correlation value is less than the first threshold is expressed by "c".

The expression "noise levels of A to B and C" refers to a result of determination as to whether the noise levels received by ultrasonic transceivers B and C when an ultrasonic wave is transmitted from ultrasonic transceiver A are equal. The case where the noise levels are equal (the difference between the noise levels is not greater than the fifth threshold) is expressed by "a"; when "noise levels of A to B and C" is "a", it indicates that the noise levels of ultrasonic transceivers B and C for receiving ultrasonic waves are equal. Also, the case where the noise levels are not equal (the difference between the noise levels is not less than the fifth threshold) is expressed by "c".

Each pattern will be described. First, in the case where an ultrasonic wave is transmitted from ultrasonic transceiver A and ultrasonic waves are received by ultrasonic transceivers B and C, when at least one of "A to B" and "A to C" is "a" (patters 1 to 3), it is possible to determine which of the ultrasonic transceivers 401 have an abnormality, by only the single transmission of the ultrasonic wave. Since at least one of the results of the ultrasonic transmission/reception is "a", ultrasonic transceiver A is normal. Thus, when there is a result of "c", the cause lies in the ultrasonic transceivers 401 for receiving ultrasonic waves. Thus, it is possible to determine that there is an abnormality in the ultrasonic transceiver 401 for receiving ultrasonic waves having the result of "c". In this case, no noise levels need be evaluated.

Also, in the case where an ultrasonic wave is transmitted from ultrasonic transceiver A and ultrasonic waves are received by ultrasonic transceivers B and C, when "A to B" and "A to C" are both "c" (patterns 4 to 8), determination results of noise levels are referred to.

When "noise levels of A to B and C" is "a" (patterns 4, 5, and 8), an ultrasonic wave is further transmitted from ultrasonic transceiver B, and ultrasonic transceivers A and C are caused to receive ultrasonic waves.

When "B to C" is "a" (pattern 5), it can be determined that ultrasonic transceivers B and C are normal, and since "A to B" and "A to C" are both "c", it can be determined that ultrasonic transceiver A is abnormal.

When "B to C" is "c" (patterns 4 and 8), the noise levels of ultrasonic transceivers A and C are compared. When "noise levels of B to A and C" is "a" (pattern 8), it can be determined that all the ultrasonic transceivers 401 are in the same state, and since none of the ultrasonic transceivers can receive the direct wave 5, it can be determined that all the ultrasonic transceivers 401 are abnormal.

Further, when "noise levels of B to A and C" is "c" (pattern 4), the determination is made as follows. Since "noise levels of A to B and C" is "a", ultrasonic transceivers B and C are in the same state. Since "noise levels of B to A and C" is "c", ultrasonic transceivers A and C are in different states. Thus, ultrasonic transceiver A is normal and ultrasonic transceivers B and C are abnormal, or ultrasonic transceiver A is abnormal and ultrasonic transceivers B and C are normal. Since "B to C" is "c", it can be determined that ultrasonic transceiver A is normal and ultrasonic transceivers B and C are abnormal.

Further, when "A to B" and "A to C" are both "c" and "noise levels of A to B and C" is "c" (patterns 6 and 7), since the noise levels are not equal, it can be determined that one of ultrasonic transceivers B and C is abnormal. Also, although one of ultrasonic transceivers B and C is normal, "A to B" and "A to C" are both "c". Thus, it can be determined that ultrasonic transceiver A is abnormal.

Here, an ultrasonic wave is further transmitted from ultrasonic transceiver B, and ultrasonic transceivers A and C are caused to receive ultrasonic waves.

When "noise levels of B to A and C" is "a" (pattern 6), since the ultrasonic transceivers A and C are in the same state and ultrasonic transceiver A is abnormal, it can be determined that ultrasonic transceiver C is abnormal. Also, since "noise levels of A to B and C" is "c", it can be determined that ultrasonic transceiver B is normal.

Also, when "noise levels of B to A and C" is "c" (pattern 7), since ultrasonic transceivers A and C are in different states and ultrasonic transceiver A is abnormal, it can be determined that ultrasonic transceiver C is normal. Also, since "noise levels of A to B and C" is "c", it can be determined that ultrasonic transceiver B is abnormal.

The object detection device 100 and the control device 101 thereof according to the fifth embodiment of the present invention are configured as above and provide the following advantages.

In the fifth embodiment, in addition to the conditions in the first embodiment, the abnormality detection of the ultrasonic transmission/reception unit is performed by using a difference between noise levels.

In a case where the abnormality detection process is performed on one ultrasonic transceiver 401 for transmitting an ultrasonic wave and two ultrasonic transceivers 401 for receiving ultrasonic waves, when no signals of the direct waves 5 are detected and the difference between the noise levels is not less than the fifth threshold (the noise levels are not equal), it is possible to determine that there is an abnormality in the ultrasonic transceiver 401 for transmitting an ultrasonic wave.

Also, when the noise levels are equal, it can be seen that the two ultrasonic transceivers 401 for receiving ultrasonic waves are in the same state, and when they are not equal, it can be seen that the two ultrasonic transceivers 401 for receiving ultrasonic waves are in different states. By switching the ultrasonic transceiver 401 for transmitting an ultrasonic wave and repeating the abnormality detection process, it is possible to determine which of the ultrasonic transceivers 401 have an abnormality.

Also, when an ultrasonic transceiver 401 that adversely affects safe driving is abnormal, it is possible to stop autonomous travel using the ultrasonic transmission/reception unit or issue an alert in the vehicle. Conversely, when an ultrasonic transceiver 401 that does not adversely affect safe driving is abnormal, it is possible to continue autonomous driving by using another ultrasonic transceiver 401, sensors, or the like.

Modifications of the object detection devices 100 and the control devices 101 thereof according to the first to fifth embodiments of the present invention will be described.

Each of the object detection devices 100 and the control devices 101 thereof according to the first to fifth embodiments obtains a correlation value between the input signal and the output signal (abnormality detection output signal) and determines whether the output signal includes a waveform of the direct wave 5 or reflected wave 4, in the object detection process and abnormality detection process. Alternatively, it is possible to detect a waveform of the direct wave 5 or reflected wave 4 directly from the output signal.

Also, each of the object detection devices 100 and the control devices 101 thereof according to the fourth and fifth embodiments obtains correlation values between the input signal and the output signal and determines an average of absolute values of the correlation values as a noise level indicating the intensity of noise in the output signal, in the abnormality detection process. Alternatively, it is possible to directly obtain an average of absolute values of amplitudes of a part of the output signal outside the period in which the direct wave 5 is present, and determine it as a noise level indicating the intensity of the noise.

Each of the object detection devices 100 and the control devices 101 thereof according to the first to fifth embodiments uses a fixed value as the sound speed. Alternatively, it is possible that the vehicle 1 is provided with a temperature sensor for measuring the outside temperature, and the control device 101 receives, from the temperature sensor via the bus 111, information indicating the measured outside temperature and corrects the sound speed on the basis of the outside temperature.

Each of the control devices 101 according to the first to fifth embodiments transmits and receives signals via the interface 104. The interface 104 may be a single interface capable of transmitting and receiving multiple types of signals, or may be one including multiple interfaces, such as an audio interface, a USB port, or an Ethernet port.

In the first and second embodiments, the acceleration of the vehicle 1 at each measurement time is calculated from multiple speed information items (step S132 of FIGS. 8 and 9). However, it is possible to provide the vehicle 1 with an acceleration sensor and determine the acceleration of the vehicle 1 at each time on the basis of an output of the acceleration sensor.

Each of the control devices 101 according to the first to fifth embodiments sets, as the integration interval in calculating the correlation value, an interval ($0 \le t \le T_1$, $0 \le t \le T_2$) having a length equal to that of the transmission time of the abnormality detection ultrasonic wave or object detection ultrasonic wave, in performing the abnormality detection process or object detection process. However, in view of occurrence of echo, a longer interval may be set as the integration interval.

A control device for an object detection device, an object detection device, and an object detection program according to the present invention can be used in the field of object detection using an ultrasonic transceiver.

DESCRIPTION OF REFERENCE CHARACTERS

1 vehicle, 2 object, 3 transmission wave, 4 reflected wave, 5 direct wave, 100 object detection device, 101 control device, 102 CPU, 103 memory, 104 interface, 105 transmission amplifier, 106 ultrasonic transmitter, 107 ultrasonic receiver, 108 reception amplifier, 109 vehicle speed sensor, 110 vehicle speed ECU, 111 bus, 112 signal line, 113 in-vehicle camera, 114 camera control ECU, 115 GPS positioning sensor, 116 positioning ECU, 117 communication ECU, 118 radio wave transceiver, 121 determiner, 122 object detector, 123 abnormality detector, 124 transmitter, 125 receiver, 401 ultrasonic transceiver.

What is claimed is:

1. A control device for an object detection device, the control device comprising:
    an object detector to output, to an ultrasonic transmitter, an input signal for causing the ultrasonic transmitter to transmit an object detection ultrasonic wave that is an ultrasonic wave transmitted for object detection, to obtain, from an ultrasonic receiver, an output signal in a period in which the object detection ultrasonic wave is reflected by an object around the ultrasonic transmitter and received as a reflected wave by the ultrasonic receiver, to determine whether the output signal includes a signal of the reflected wave, and to detect the object;
    an abnormality detector to perform, as an abnormality detection process, outputting, to the ultrasonic transmitter, an input signal for causing the ultrasonic transmitter to transmit an abnormality detection ultrasonic wave that is an ultrasonic wave whose transmission time is longer than that of the object detection ultrasonic wave, obtaining, from the ultrasonic receiver, an abnormality detection output signal that is an output signal in a period in which the abnormality detection ultrasonic wave is to be received as a direct wave by the ultrasonic receiver, determining whether the abnormality detection output signal includes a signal of the direct wave, and detecting an abnormality in the ultrasonic transmitter or the ultrasonic receiver when no signal of the direct wave is included; and
    a determiner to obtain speed information indicating a speed of a vehicle during driving provided with the ultrasonic transmitter and the ultrasonic receiver, determine whether the speed indicated by the speed information is not greater than a second threshold that is a predetermined positive threshold, and when a vehicle stop condition that the speed indicated by the speed information is not greater than the second threshold is satisfied, cause the abnormality detector to start the abnormality detection process.

2. The control device for the object detection device of claim 1, wherein
    the input signal output by the abnormality detector is a signal that causes the ultrasonic transmitter to transmit the abnormality detection ultrasonic wave, a sum of absolute values of amplitudes of the abnormality detection ultrasonic wave being greater than that of the object detection ultrasonic wave, and
    the abnormality detector calculates a correlation value between the input signal output by the abnormality detector and the abnormality detection output signal, and when the correlation value is not greater than a first threshold that is a predetermined threshold, determines that the abnormality detection output signal includes no signal of the direct wave.

3. The control device for the object detection device of claim 2, wherein the input signal output by the abnormality detector is a signal that causes the ultrasonic transmitter to transmit the abnormality detection ultrasonic wave, a code being superimposed on the abnormality detection ultrasonic wave.

4. The control device for the object detection device of claim 1, wherein the determiner obtains an acceleration of the vehicle, and when an absolute value of the acceleration is not greater than a third threshold that is a predetermined threshold and the vehicle stop condition is satisfied, causes the abnormality detector to start the abnormality detection process.

5. The control device for the object detection device of claim 1, wherein the determiner obtains an image in front of the vehicle, and when the image includes a stop signal of a traffic light and the vehicle stop condition is satisfied, causes the abnormality detector to start the abnormality detection process.

6. The control device for the object detection device of claim 1, wherein the abnormality detector
    obtains, from the ultrasonic receiver, an output signal in a period different from the period in which the direct wave is to be received by the ultrasonic receiver, and determines a noise level indicating an intensity of noise in the output signal in the different period, and
    in a case where it is determined that the abnormality detection output signal includes no signal of the direct wave, when the noise level is not less than a fourth threshold that is a predetermined threshold, detects that there is an abnormality in the ultrasonic transmitter out of the ultrasonic transmitter and the ultrasonic receiver.

7. An object detection device comprising:
    an ultrasonic transceiver including an ultrasonic transmitter provided in a vehicle and two ultrasonic receivers provided in the vehicle and capable of receiving an ultrasonic wave from the ultrasonic transmitter;
    an object detector connected to the ultrasonic transceiver, the object detector outputting, to the ultrasonic transmitter, an input signal for causing the ultrasonic transmitter to transmit an object detection ultrasonic wave that is an ultrasonic wave for performing object detection, obtaining, from at least one of the two ultrasonic receivers, an output signal in a period in which the object detection ultrasonic wave is reflected by an object around the ultrasonic transceiver and received as a reflected wave by the ultrasonic receiver, determining whether the output signal includes a signal of the reflected wave, and detecting the object; and
    an abnormality detector connected to the ultrasonic transceiver, the abnormality detector performing, as an abnormality detection process, outputting, to the ultrasonic transmitter, an input signal for causing the ultrasonic transmitter to transmit an abnormality detection ultrasonic wave that is an ultrasonic wave whose transmission time is longer than that of the object detection ultrasonic wave, obtaining, from each of the two ultrasonic receivers, an abnormality detection output signal that is an output signal in a period in which the abnormality detection ultrasonic wave is to be received as a direct wave by the ultrasonic receiver, determining whether each of the abnormality detection output signals includes a signal of the direct wave, obtaining, from each of the two ultrasonic receivers, an output signal in a period different from the period in which the direct wave is to be received by the ultrasonic receiver, calculating, for each of these output signals, a noise level indicating an intensity of noise from another vehicle, and when each of the abnormality detection output signals obtained from the two ultrasonic receivers includes no signal of the direct wave and a difference between the two calculated noise levels is not less than a predetermined fifth threshold, detecting that there is an abnormality in the ultrasonic transmitter.

8. A non-transitory computer-readable storage medium storing an object detection program for causing a control device connected to an ultrasonic transmitter and an ultrasonic receiver to function as:

an object detector to output, to the ultrasonic transmitter, an input signal for causing the ultrasonic transmitter to transmit an object detection ultrasonic wave that is an ultrasonic wave transmitted for object detection, to obtain, from the ultrasonic receiver, an output signal in a period in which the object detection ultrasonic wave is reflected by an object around the ultrasonic transmitter and received as a reflected wave by the ultrasonic receiver, to determine whether the output signal includes a signal of the reflected wave, and to detect the object;

an abnormality detector to perform, as an abnormality detection process, outputting, to the ultrasonic transmitter, an input signal for causing the ultrasonic transmitter to transmit an abnormality detection ultrasonic wave that is an ultrasonic wave whose transmission time is longer than that of the object detection ultrasonic wave, obtaining, from the ultrasonic receiver, an abnormality detection output signal that is an output signal in a period in which the abnormality detection ultrasonic wave is to be received as a direct wave by the ultrasonic receiver, determining whether the abnormality detection output signal includes a signal of the direct wave, and detecting an abnormality in the ultrasonic transmitter or the ultrasonic receiver when no signal of the direct wave is included; and a determiner to obtain speed information indicating a speed of a vehicle during driving provided with the ultrasonic transmitter and the ultrasonic receiver, determine whether the speed indicated by the speed information is not greater than a second threshold that is a predetermined positive threshold, and when a vehicle stop condition that the speed indicated by the speed information is not greater than the second threshold is satisfied, cause the abnormality detector to start the abnormality detection process.

* * * * *